(12) United States Patent
Anas

(10) Patent No.: US 7,970,642 B2
(45) Date of Patent: Jun. 28, 2011

(54) COMPUTER BASED SYSTEM TO GENERATE DATA FOR IMPLEMENTING REGIONAL AND METROPOLITAN ECONOMIC, LAND USE AND TRANSPORTATION PLANNING

(76) Inventor: Alex Anas, Williamsville, NY (US)

(*) Notice: Subject to any disclaimer, the term of this patent is extended or adjusted under 35 U.S.C. 154(b) by 1217 days.

(21) Appl. No.: 11/646,111

(22) Filed: Dec. 27, 2006

(65) Prior Publication Data
US 2007/0162372 A1 Jul. 12, 2007

Related U.S. Application Data

(60) Provisional application No. 60/754,170, filed on Dec. 27, 2005.

(51) Int. Cl.
*G06F 17/30* (2006.01)
*G07G 1/00* (2006.01)
(52) U.S. Cl. ........................................................ 705/10
(58) Field of Classification Search .................. 705/10
See application file for complete search history.

(56) References Cited

U.S. PATENT DOCUMENTS

| | | | | |
|---|---|---|---|---|
| 5,257,200 | A * | 10/1993 | Machala et al. | 703/2 |
| 5,265,028 | A * | 11/1993 | Machala, III | 703/2 |
| 5,486,995 | A * | 1/1996 | Krist et al. | 700/29 |
| 5,739,774 | A * | 4/1998 | Olandesi | 340/994 |
| 5,818,737 | A * | 10/1998 | Orr et al. | 703/6 |
| 5,863,203 | A * | 1/1999 | Bragdon | 434/29 |
| 2004/0260573 | A1* | 12/2004 | Schmitt | 705/1 |
| 2008/0281673 | A1* | 11/2008 | Davis et al. | 705/10 |

OTHER PUBLICATIONS

Anas, Alex. 1982. Residential Location Markets and Urban Transportation: Economic Theory, Econometrics and Policy Analysis with Discrete Choice Models. Academic Press, New York, ISBN 0-12057920-0, 1-14.
Anas, Alex. 1987. Modeling in Urban and Regional Economics, vol. 26 in Fundamentals of Pure and Applied Economics, Jacques Lesourne and Hugo Sonnenschein (editors-in-chief), Harwood Academic Publishers, New York. ISBN 3-7186-0467-1, 1-9.
Anas, Alex. "The Conduct of Faulty Model Integration Experiments by Elena Safirova at Resources for the Future", Sep. 23, 2005.

(Continued)

*Primary Examiner* — Kambiz Abdi
*Assistant Examiner* — Leland Marcus
(74) *Attorney, Agent, or Firm* — Simpson & Simpson, PLLC

(57) ABSTRACT

The present invention comprises a method for forecasting future economic conditions, land utilization and transportation network utilization and performance of a metropolitan area having a plurality of economic zones, the method includes the steps of: a) receiving a set of calibration values from a first input device; b) calculating a set of calibration constants with a first arithmetic logic unit; c) receiving a set of initial values for a set of desired outputs from a second input device, wherein the set of desired outputs includes regional economic, land use and transportation outputs; d) calculating the regional economic and land use outputs with a second arithmetic logic unit, wherein the regional economic and land use outputs include a first group of variable travel demands; e) calculating an origin to destination matrix with a third arithmetic logic unit, wherein the origin to destination matrix includes two-way daily person trips between an origin economic zone and a destination economic zone; f) calculating the transportation outputs with a fourth arithmetic logic unit, wherein the transportation outputs include a second group of variable travel demands; h) repeating steps d) through f) until the first group of variable travel demands is substantially the same as the second group of variable travel demands; and, g) providing the set of desired outputs to an output device.

16 Claims, 5 Drawing Sheets

OTHER PUBLICATIONS

Anas, Alex and Richard J. Arnott.1991."Dynamic Housing Market Equilibrium with Taste Heterogeneity, Idiosyncratic Perfect Foresight and Stock Conversions", Journal of Housing Economics,1,1, 2-32.

Anas, Alex and Richard J. Arnott. 1993. "Development and Testing of the Chicago Prototype Housing Market Model", Journal of Housing Research , 4 (I), 73-130. (Downloadable from http://www.fanniemaefoundation.org/programs/jhr/v4il-index.shtml).

Anas, Alex and Richard J. Arnott. 1997. "Taxes and Allowances in a Dynamic Equilibrium Model of Urban Housing Market with a Size-Quality Hierarchy", Regional Science and Urban Economics, 27, 547-580.

Anas, Alex and Liang-Shyong Duann. 1985. "Dynamic Forecasting of Travel Demand, Residential Location and Land Development: Policy Simulations with the Chicago Area Transportation/Land Use Analysis System", Papers of the Regional Science Association, 56, 38-58.

Anas, Alex and Ikki Kim. 1990. "Network Loading versus Equilibrium Estimation of the Stochastic Route Choice Model Maximum Likelihood versus Least Squares Revisited", Journal of Regional Science, 30, 1, 89-103.

Anas, Alex and Ikki Kim. 1996. "General Equilibrium Models of Polycentric Urban Land Use with Endogenous Congestion and Job Agglomeration", Journal of Urban Economics, 40, 232-256.

Anas, Alex and Hyok-Joo Rhee. 2006. "Curbing Excess Sprawl with Congestion Tolls and Urban Boundaries," Regional Science and Urban Economics, 36, 510-541.

Anas, Alex and Rong Xu. 1999. "Congestion, Land Use and Job Dispersion: A General Equilibrium Analysis", Journal of Urban Economics , 45,3, 451-473.

Armington, P.S. 1969. "The Geographic Pattern of Trade and the Effects of Price Changes," IMF Staff Papers 17,:488-523.

Bar-Gera, Hillel. 2002. "Origin-Based Algorithms for the Travel Assignment Problem," Transportation Science 36, 398-417.

Bar-Gera, Hillel and David E. Boyce. 2003. "Origin-based Algorithms for Combined Travel Forecasting Models", Transportation Research B, 37, 405-422.

Beckmann, Martin, C.B. McGuire, and C.B. Winsten. 1958. Studies in the Economics of Transportation, Cowles Foundation for Research in Economics, Yale University, New Haven, xi-xix, 59-73.

Boyce, David E . . . and Michael Florian. 2005. "Workshop on Traffic Assignment with Equilibrium Methods," Subcommittee on Network Equilibrium Modeling, Transportation Network Modeling Committee, Transportation Research Board, Jan. 9. (Downloadable on Jan. 6, 2006 from the website: http://supernet.som.umass.edu/visuals/boyce_convergence_part1.pdf).

Daganzo, Carlos F. and Yoseff Sheffi. 1977. "On Stochastic Models of Traffic Assignment," Transportation Science, 11, 253-274.

De la Barra, Tomas. 1989. Integrated Land Use and Transport Modeling, Cambridge University Press, Cambridge, 1-18.

Dixit, Avinash. and Joseph Stiglitz. 1977. "Monopolistic Competition and Optimum Product Diversity," American Economic Review, 67(3), 297-308.

Evans, Suzanne P. 1976. "Derivation and Analysis of Some Models for Combining Trip Distribution and Assignment," Transportation Research, 10, 37-57.

Florian, Michael and S. Nguyen. 1976. "An Application and Validation of Equilibrium Trip Assignment Models," Transportation Science, 10, 374-390.

Harris, Britton. 1968. "Quantitative Models of Urban Development: Their Role in Metropolitan Policy-Making," in H.S. Perloff and L.Wingo, Jr. (eds.) Issues in Urban Economics. Baltimore, MD: Johns Hopkins Press, 363-412.

Harris, Britton. 1985. "Urban Simulation Models in Regional Science," Journal of Regional Science, 25, 4, 545-567.

Hartwick, Philipp.G. and John M. Hartwick. 1974. "Efficient Resource Allocation in a Multinucleated City with Intermediate Goods", Quarterly Journal of Economics, 88, 340-352.

Herbert, John D. and Benjamin H. Stevens. 1960. "A Model for the Distribution of Residential Activity in Urban Areas," Journal of Regional Science, 2, 21-36.

Ingram, Gregory.K., John F. Kain, and J.R. Ginn. 1972. The Detroit Prototype of the NBER urban Simulation Model, New York, National Bureau of Economic Research, 1972.

Judd, Kenneth.L. 1998. Numerical Methods in Economics, Cambridge, Mass: MIT Press.

Kim, T-J. 1979. "Alternative Transportation Modes in a Land Use Model: A General Equilibrium Approach," Journal of Urban Economics, 6, 2. 197-215.

Lowry, Ira S. 1964. A Model of Metropolis, RM-4035-RC, Santa Monica, RAND Corp.

Lundqvist, Lars. 2004. "Transport Systems and Urban Equilibrium", in Capello, R. and Nijkamp, P. (eds): Urban Dynamics and Growth—Advances in Urban Economics, Elsevier, Amsterdam.

Mansur, Erin.T., John M. Quigley, Steven Raphael and Eugene Smolensky. 2002. "Examining Policies to Reduce Homelessness Using a General Equilibrium Model of the Housing Market", Journal of Urban Economics, 52, 316-340.

Martinez, Francisco. (1992) "The bid-choice land use model: an integrated economic framework", Environment and Planning A 15, 871-885.

Martinez. Francisco. (1996). "MUSSA: A Land Use Model for Santiago City", Transportation Research Record 1552: Transportation Planning and Land Use at State, Regional and Local Levels, 126-134; Republished as: "MUSSA II: a land use equilibrium model based on constrained idiosyncratic behavior of all agents in an auction market.", (2007).

McDonald John F. and Clifford I. Osuji. 1995. "The Effect of Anticipated Transportation Improvement on Residential Land Value", Regional Science and Urban Economics, (25), 261-278.

McFadden, Daniel. 1973. "Conditional Logit Analysis and Qualitative Choice Behavior," in Frontiers in Econometrics ed. By P. Zarembka, New York: Academic Press.

McMillen, Daniel and John F. McDonald. 2004. "Reaction of House Prices to a New Rapid Transit Line: Chicago's Midway Line, 1983-1999", Real Estate Economics, 32(3), 462-486.

Mills, Edwin S. 1972. "Markets and Efficient Resource Allocation in Urban Areas," Swedish Journal of Economics, 74, 100-113.

Moore, James E. and Lyna Wiggins. 1990. "A Dynamic Mills Heritage Model with Replaceable Capital," Papers of the Regional Science Association, 68, 23-41.

Putman, S.H. 1983. Integrated Urban Models, London, Pion Press, 1-36.

Waddell, Paul. 1998. "An Urban Simulation Model for Integrated Policy Analysis and Planning: Residential Location and Housing Market Components of UrbanSim", Proceedings of the 8th World Conference on Transport Research, Antwerp, Belgium Jul. 12-17.

Wegener, Michael. 1998. "Applied Models of Urban Land Use, Transport and Environment: State of the Art and Future Developments." In Lundqvist, L., Mattson, L.-G. Kim, T.J. (Eds.): Network Infrastructure and the Urban Environment. Advances in Spatial Systems Modelling. Berlin/Heidelberg: Springer Verlag, 245-267.

Wegener, Michael. 2004. "Overview of Land-Use Transport Models." In Hensher, A., David, Button, Kenneth (Eds.): Transport Geography and Spatial Systems. Handbook 5 of the Handbook in Transport. Pergamon/Elsevier Science, Kidlington, UK, 2004, 127-146.

* cited by examiner

COMPUTER BASED SYSTEM TO GENERATE DATA FOR IMPLEMENTING REGIONAL AND METROPOLITAN ECONOMIC, LAND USE AND TRANSPORTATION PLANNING

CROSS-REFERENCE TO RELATED APPLICATIONS

The present application claims benefit under 35 U.S.C. §119(e) of U.S. Provisional Patent Application Ser. No. 60/754,170 filed Dec. 27, 2005, which application is incorporated herein by reference.

STATEMENT REGARDING FEDERALLY SPONSORED RESEARCH

The U.S. Government has a paid-up license in this invention and the right in limited circumstances to require the patent owner to license others on reasonable terms as provided for by the terms of National Science Foundation Urban Research Initiative Grant No. SES 9816816 awarded by the National Science Foundation.

REFERENCE TO COMPUTER PROGRAM LISTING/TABLE APPENDIX

The present application includes a computer program listing appendix on compact disc. Two duplicate compact discs are provided herewith. Each compact disc contains an ASCII text file of the computer program listing as follows:

| File Name | Size | Created |
|---|---|---|
| cal_ftime_fmcost_20051018.f | 26 KB | Dec. 27, 2005 |
| flowsim20050917.f | 9 KB | Dec. 27, 2005 |
| main_relutran_20051216print_aveB.f | 26 KB | Dec. 27, 2005 |
| newrelu12022004_14LY20051209nosquare2v2_tryanotherEPSCONV.f | 236 KB | Dec. 27, 2005 |
| sub_autotrips_20050924.f | 2 KB | Dec. 27, 2005 |
| sub_flowsim20050924.f | 10 KB | Dec. 27, 2005 |
| sub_ftime_fmcost_20051201.f | 24 KB | Dec. 27, 2005 |
| sub_relusim_relutrips_200501216.f | 137 KB | Dec. 27, 2005 |
| sub_result.f | 23 KB | Dec. 27, 2005 |

The computer program listing appendix is hereby expressly incorporated by reference in the present application.

FIELD OF THE INVENTION

The present invention pertains to methods and systems for economic forecasting, specifically a method and system for receiving and calculating regional economic and land-use data and processing that data to generate a dynamic economic and land-use forecast with a proposed land use zone map and a traffic network to support the economic and land-use forecast.

BACKGROUND OF THE INVENTION

Not all economic models conform to linear, quadratic or other standard nonlinear programming formulations. Rather, such models require the solution of highly non-linear equations systems using nonstandard and innovative, iterative algorithms that exploit the special features of those equations. Numerical solutions of models using iterative techniques have been a goal, though poorly practiced within the field of transportation and land use modeling. Meanwhile, iterative numerical methods are gaining broader applicability within economics to solve a variety of problems. For example, a survey and exposition of such methods and problems is described in *Numerical Methods in Economics*. See Kenneth L. Judd, *Numerical Methods in Economics* (MIT Press 1998).

A brief overview of relevant art is helpful in order to understand the deficiencies in the known methodologies. Lowry's model in 1964 was the first to recognize the importance of building a computable model of a metropolitan area. See Ira S. Lowry, *A Model of Metropolis* (RM-4035-RC, RAND Corp., 1964). Lowry's model was limited by the available data and lack of any prior theory, since urban economics had barely emerged in 1964. Thus, Lowry used crude gravity models with ad-hoc equilibration of land use. This modeling style was durably influential on a subsequent line of developments commonly known as "Lowry-type models", e.g., DRAM-EMPAL, which models lacked economic content (See S. H. Putman, *Integrated Urban Models* (Pion Press 1983)), even after data became available and existing theories improved. Following Lowry, however, there were two important benchmark contributions by economists.

First, the NBER model of housing markets made strides in computability, by introducing better microeconomic content and emphasizing policy applicability. See Gregory K. Ingram, John F. Kain, and J. R. Ginn, *The Detroit Prototype of the NBER Urban Simulation Model* (National Bureau of Economic Research 1972). This work inspired extensions to models that culminated in the Anas and Arnott model of housing markets. See Alex Anas and Richard J. Arnott, *Dynamic Housing Market Equilibrium with Taste Heterogeneity, Idiosyncratic Perfect Foresight and Stock Conversions*, Journal of Housing Economics, 1, 1, 2-32 (1991); Alex Anas and Richard J. Arnott, *Taxes and Allowances in a Dynamic Equilibrium Model of Urban Housing Market with a Size-Quality Hierarchy*, 27 Regional Science and Urban Economics 547, 547-580 (1997). Second, the general equilibrium model of metropolitan structure developed by Mills and extended by Hartwick and Hartwick, and Kim, utilized a linear programming based fixed-coefficient technology, but included a sophisticated treatment of traffic congestion on a grid geography with endogenous road capacities. See Edwin S. Mills, *Markets and Efficient Resource Allocation in Urban Areas*, 74 Swedish Journal of Economics 100, 100-113 (1972); Philipp G. Hartwick and John M. Hartwick, *Efficient Resource Allocation in a Multinucleated City with Intermediate Goods*, 88 Quarterly Journal of Economics 340, 340-352 (1974); T-J. Kim, *Alternative Transportation Modes in a Land Use Model: A General Equilibrium Approach*, Journal of Urban Economics, 6, 2, 197-215 (1979). A dynamic version was later developed by Moore in his doctoral dissertation. See James E. Moore and Lyna Wiggins, *A Dynamic Mills Heritage Model with Replaceable Capital*, 68 Papers of the Regional Science Association 23, 23-41 (1990). The linear programming structure used in the aforementioned models, although fully consistent with economic theory and solvable using standard methods and the earlier partial equilibrium model of Herbert and Stevens, have limitations that affect empirical relevance, computability and ease of calibration. See John D. Herbert and Benjamin H. Stevens, *A Model for the Distribution of Residential Activity in Urban Areas*, 2 Journal of Regional Science 21, 21-36 (1960). These limitations were overcome by the use of discrete choice models which are better suited to treating heterogeneity as explained by Anas, and supported by Harris. See Alex Anas, *Residential Location Markets and Urban Transportation: Economic Theory, Econometrics and Policy Analysis with Discrete Choice Models* (Academic Press 1982); Britton Harris, *Urban Simulation Models in Regional Science*, Journal of Regional Science, 25, 4, 545-567 (1985). In the 1990s Anas-Kim, Anas-Xu and more recently Anas-Rhee extended the prior body of work to general equilibrium formulations by using discrete choice to model the joint choice of workplace, residence and housing type while unifying it with the Dixit and Stiglitz representation of utility and production functions to generate budget-constrained discretionary trips for consumers and inter-industry linkages for producers. See Alex Anas and Ikki Kim, *General Equilibrium Models of Polycentric Urban Land Use with Endogenous Congestion and Job Agglomeration*, 40 Journal of Urban Economics 232, 232-256 (1996); Alex Anas and Rong Xu, *Congestion, Land Use and Job Dispersion: A General Equilibrium Analysis*, Journal of Urban Economics, 45, 3, 451-473 (1999); Alex Anas and Hyok-Joo Rhee, *Curbing Urban Sprawl with Congestion Tolls and Urban Boundaries*, 36 Regional Science and Urban Economics, 510, 510-541 (2006); Avinash Dixit and Joseph Stiglitz, *Monopolistic Competition and Optimum Product Diversity*, American Economic Review, 67(3), 297-308 (1977).

As the aforementioned models were developing, the modeling of equilibrium traffic on congested highway networks by transportation scientists, evolved largely separate from urban economics. Florian and Nguyen provided one of the earliest, while Bar-Gera provided one of the most recent, algorithms that find traffic equilibria on arbitrarily configured highway networks with fixed capacities, making operational the mathematical programming formulation of static traffic flow by Beckmann, McGuire and Winsten. See Michael Florian and S. Nguyen, *An Application and Validation of Equilibrium Trip Assignment Models*, 10 Transportation Science 374, 374-390 (1976); Hillel Bar-Gera, *Origin-Based Algorithms for the Travel Assignment Problem*, 36 Transportation Science 398, 398-417 (2002); Martin Beckmann, C. B. McGuire, and C. B. Winsten, *Studies in the Economics of Transportation*, Cowles Foundation for Research in Economics, Yale University (1958). However, being focused on transportation, these models take the land use distribution and, often, the distribution of zone-to-zone trips as being fixed. This contrasts with urban economic theories where the interdependence of transportation and land use has been center-stage from the beginnings of the field of study.

It has been recognized since the 1960s that a consistent operational metropolitan model, should integrate a model of congested traffic network equilibrium with a model of land use. This has led to a variety of efforts to devise integrated transportation and land use models in both academia and planning practice without proper grounding in economics. In one line of such model integration, a rigorous, well-documented but partial form of model integration is sometimes attempted as an extension of travel demand analysis in order to improve travel forecasts. In such efforts, the origin-zone to destination-zone trip matrices are not fixed, as is common in conventional travel analysis, but respond in some cost-sensitive way to equilibrium travel costs on the networks. These "integrated models of origin-destination, mode and route choice" or "combined models" date back to Evans. See Suzanne P. Evans, *Derivation and Analysis of Some Models for Combining Trip Distribution and Assignment*, 10 Transportation Research 37, 37-57 (1976). Only the trip generation, distribution, mode choice and network equilibrium steps of travel forecasting are combined or treated with feedbacks, but land use remains implicitly fixed. The state-of-the-practice in these combined models is well-documented in a recent presentation by Boyce and Florian, including large scale "computational experiments for various integrated models of variable demand and auto route choice for a single, aggregated class of travelers plus trucks." See David E. Boyce and Michael Florian, *Workshop on Traffic Assignment with Equilibrium Methods*, Subcommittee on Network Equilibrium Modeling, Transportation Network Modeling Committee, Transportation Research Board, Jan. 9, 2005. Although combined models are a step forward from the traditional four-step model of sequential travel forecasting, none of these integration experiments include the variable travel demands made consistent with a land use model, nor is a fully economic land use or regional economy model made to respond to these travel demands. According to Boyce and Florian, although the combined models used in planning practice show convergence to equilibrium in some large scale applications, they may not always converge well or to a high level of accuracy, but scholars (See, e.g., Bar-Gera and Boyce) are continuing to develop faster algorithms.

In a second line of applications in metropolitan planning by consultants and practitioners, successful transportation and land use model integration has been a goal. Models that have reportedly attempted this include MEPLAN, or the closely related TRANUS model of De la Barra. See Tomas De la Barra, *Integrated Land Use and Transport Modeling* (Cambridge University Press 1989). These are not fully documented in scientific journals or in other publicly available forms, and cannot therefore be understood or evaluated completely. The MUSSA model of Martinez is better documented in scientific journals. See Francisco Martinez, *The bid-choice land use model: an integrated economic framework*, 15 Environment and Planning A 871, 871-885 (1992); Francisco Martinez, *MUSSA: A Land Use Model for Santiago City*, Transportation Research Record 1552: Transportation Planning and Land Use at State, Regional and Local Levels, 126-134 (1996). The popular do-it-yourself modeling template of Wadell, UrbanSim, is open source and it is easy to verify that prices are not market clearing and that it does not conform to economic theory. See Paul Waddell, *An Urban Simulation Model for Integrated Policy Analysis and Planning: Residential Location and Housing Market Components of UrbanSim*, Proceedings of the 8th World Conference on Transport Research, Antwerp, Belgium July 12-17 (1998). Model integration in practice is highly demanding of technical personnel.

In the past, antecedents of the instant invention that were not as general were used to evaluate the effects of planned transportation investments on real estate prices. See Alex Anas and Liang-Shyong Duann, *Dynamic Forecasting of Travel Demand, Residential Location and Land Development: Policy Simulations with the Chicago Area Transportation/Land Use Analysis System*, 56 Papers of the Regional Science Association 38, 38-58 (1985). After the investments took place and price changes were measured, other models, McDonald and Osuji (1995) and McMillen and McDonald (2004), claimed that the forecasts were accurate. See John F. McDonald and Clifford I. Osuji, *The Effects of Anticipated Transportation Improvement on Residential Land Value*, 5 Regional Science and Urban Economics 261, 261-278 (1995); Daniel McMillen and John F. McDonald, *Reaction of House Prices to a New Rapid Transit Line: Chicago's Midway Line*, 1983-1999, Real Estate Economics, 32(3), 462-486 (2004). In another model by Anas and Arnott (1997), a dynamic housing market model was used to compare conflicting aspects of taxation and of subsidies on the Chicago housing market. See Alex Anas and Richard J. Arnott, *Taxes and Allowances in a Dynamic Equilibrium Model of Urban Housing Market with a Size-Quality Hierarchy*, 27 Regional Science and Urban Economics 547, 547-580 (1997). While the same model was used in four MSAs to compare the welfare effects of demand-side and supply-side housing subsidization policies on the welfare of consumer groups. See Alex Anas and Richard J. Arnott, *Development and Testing of the Chicago Prototype Housing Market Model*, Journal of Housing Research, 4 (1), 73-130 (1993). Recently, another model adopted the stationary version of the same dynamic model to examine the causes of homelessness in California and the effects of various policies on the homeless. See Erin. T. Mansur, John M. Quigley, Steven Raphael and Eugene Smolensky, *Examining Policies to Reduce Homelessness Using a General Equilibrium Model of the Housing Market*, 52 Journal of Urban Economics 316, 316-340 (2002).

Thus, there is a long-felt need for a method of modeling the interrelations between regional economic, land use and transportation needs for a metropolitan area which is capable of responding to varying travel demands. There also is a long-felt need for a method of modeling the interrelations between regional economic, land use and transportation needs for a metropolitan area in order to predict the effects of changes to a variety of characteristics of the metropolitan area.

BRIEF SUMMARY OF THE INVENTION

The present invention broadly comprises a method for forecasting future economic conditions, land utilization and transportation network utilization and performance of a metropolitan area having a plurality of economic zones, the method includes the steps of: a) receiving a set of calibration values from a first input device; b) calculating a set of calibration constants with a first arithmetic logic unit; c) receiving a set of initial values for a set of desired outputs from a second input device, wherein the set of desired outputs includes regional economic, land use and transportation outputs; d) calculating the regional economic and land use outputs with a second arithmetic logic unit, wherein the regional economic and land use outputs include a first group of variable travel demands; e) calculating an origin to destination matrix with a third arithmetic logic unit, wherein the origin to destination matrix includes two-way daily person trips between an origin economic zone and a destination economic zone; f) calculating the transportation outputs with a fourth arithmetic logic unit, wherein the transportation outputs include a second group of variable travel demands; h) repeating steps d) through f) until the first group of variable travel demands is substantially the same as the second group of variable travel demands; and, g) providing the set of desired outputs to an output device. In some embodiments, at least two of the first, second, third and fourth arithmetic logic units are the same, while in other embodiments, the first and second input devices are the same. Additionally, in some embodiments, at least one of the first and second input devices is a keyboard, a memory storage device or an optical device, while in other embodiments, the output device is a computer monitor, a computer printout or a memory storage device.

In a further embodiment, the method is arranged to respond to the first and second group of travel demands, while in yet still a further embodiment, interrelations of the regional economic, land use and transportation outputs are solved simultaneously to calculate an equilibrium between the regional economic, land use and transportation outputs.

In yet another embodiment, the set of calibration constants is calculated by a method including the steps of: a) calculating after tax wages with the first arithmetic logic unit; b) calculating non-wage incomes with the first arithmetic logic unit; c) calculating labor supplies and places of employment by skill levels with the first arithmetic logic unit; d) calculating full incomes, residential floor space demands and full choice probabilities for workers with the first arithmetic logic unit; e) calculating residential floor space demands and full choice probabilities for non-workers with the first arithmetic logic unit; f) calculating aggregate residential floor space demands and structural densities with the first arithmetic logic unit; g) calculating aggregate labor demands by distributing labor supplies by skill levels among industries in each economic zone and initialization of aggregate building demands with the first arithmetic logic unit; h) calculating initial floor space stocks and structural densities with the first arithmetic logic unit; i) calculating construction and demolition probabilities with the first arithmetic logic unit; j) calculating unit prices and real and nominal outputs for construction and demolition with the first arithmetic logic unit; k) calculating labor demands of construction and demolition industries and adjusted labor demands of other industries with the first arithmetic logic unit; m) calculating nominal outputs of primary industries and updated structural densities with the first arithmetic logic unit; n) repeating steps i) through m) until the structural densities converge; o) calculating leading terms of price equations with the first arithmetic logic unit; p) calculating labor demand constants with the first arithmetic logic unit; q) calculating building demand constants with the first arithmetic logic unit; r) calculating retail demands with the first arithmetic logic unit, wherein the retail demands comprise trip quantities and demanded retail goods; s) repeating steps a) through r) until non-negative retail exports converge; t) calculating delivered prices of intermediate inputs and initial input demand constants with the first arithmetic logic unit; u) calculating intermediate goods demands and net exports of non-retail industries with the first arithmetic logic unit; v) repeating step u) until the calculated intermediate goods demands and net exports of non-retail industries converge; w) calculating scale factors for industries with the first arithmetic logic unit; x) calculating a total asset income, outside incomes and earned income shares with the first arithmetic logic unit; y) calculating occupancy dispersion parameters and constants with the first arithmetic logic unit; z) calculating dispersion parameters of construction and demolition with the first arithmetic logic unit; aa) calculating constants of construction and demolition with the first arithmetic logic unit; ab) calculating constants of retail demand functions with the first arithmetic logic unit; ac) calculating constant effects and dispersion of worker and non-worker choice probabilities with the first arithmetic logic unit; and, ad) calculating constant effects and dispersions in mode choice with the first arithmetic logic unit.

In still yet another embodiment of the present invention, the set of initial values includes product prices, industry outputs, wages, rents, real estate asset values and stationary real estate stocks.

In another embodiment of the present invention, the regional economic and land use outputs are calculated by a method including the steps of: a) calculating product prices with the second arithmetic logic unit; b) calculating industry outputs with the second arithmetic logic unit; c) calculating wages with the second arithmetic logic unit; d) calculating rents with the second arithmetic logic unit; e) calculating real estate asset values with the second arithmetic logic unit; f) calculating stationary real estate stocks with the second arithmetic logic unit; and, g) repeating steps a) through f) until the prices, outputs, wages, rents, values and stocks converge, and until excess demands and economic profits converge. In a further embodiment, the regional economic and land use outputs include product prices, industry outputs, wages, rents, real estate asset values and stationary real estate stocks, while in still a further embodiment, the regional economic and land use outputs further include excess demands and economic profits.

In yet another embodiment, the origin to destination matrix is calculated according to the equation:

$$RELUTRIPS_{ij} = \left(\sum_{\forall f} N_f \sum_{k=1}^{\aleph_1} P_{ijk|f}\right) +$$

$$\left(\frac{1}{d}\right)\left(\sum_{\forall f} N_f \sum_{s=0}^{\mathcal{J}'} \sum_{k=1}^{\aleph_1} P_{isk|f} c_{isf} Z_{j|isf}\right); j > 0,$$

$$i = 1 \ldots \mathcal{J}',$$

where $P_{ijk|f} = P_{ijk|f}(p_R, R, w, M_f, G, g)$ and $Z_{j|isf} = Z_{j|isf}(p_R, w_{sf}, M_f, G_{is}, g_{is}, G_i, g_i)$.

While in still another embodiment, the transportation outputs are calculated by a method including the steps of: a) calculating auto mode probabilities with the third arithmetic logic unit; b) calculating route choices and network equilibrium flows with the third arithmetic logic unit; c) repeating step b) until the route choices and network equilibrium flows converge; d) calculating congested highway link travel times with the third arithmetic logic unit; and, e) calculating zone to zone expected travel times and costs with the third arithmetic logic unit. In still yet another embodiment, the transportation outputs include zone to zone expected travel times and costs, while in yet another embodiment, the transportation outputs further include auto mode probabilities, route choices, network equilibrium flows and congested highway link travel times.

It is a general object of the present invention to provide a method of modeling regional economic, land use and transportation needs for a metropolitan area.

It is another general object of the present invention to provide a method of modeling the interrelations between regional economic, land use and transportation systems for a metropolitan area in order to predict the effects of changes to a variety of characteristics of the metropolitan area, e.g., population, demands for exports, transportation network structure, or stock of buildings.

It is yet another object of the present invention to provide a method of modeling the interrelations between regional economic, land use and transportation needs for a metropolitan area which is capable of responding to varying travel demands.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
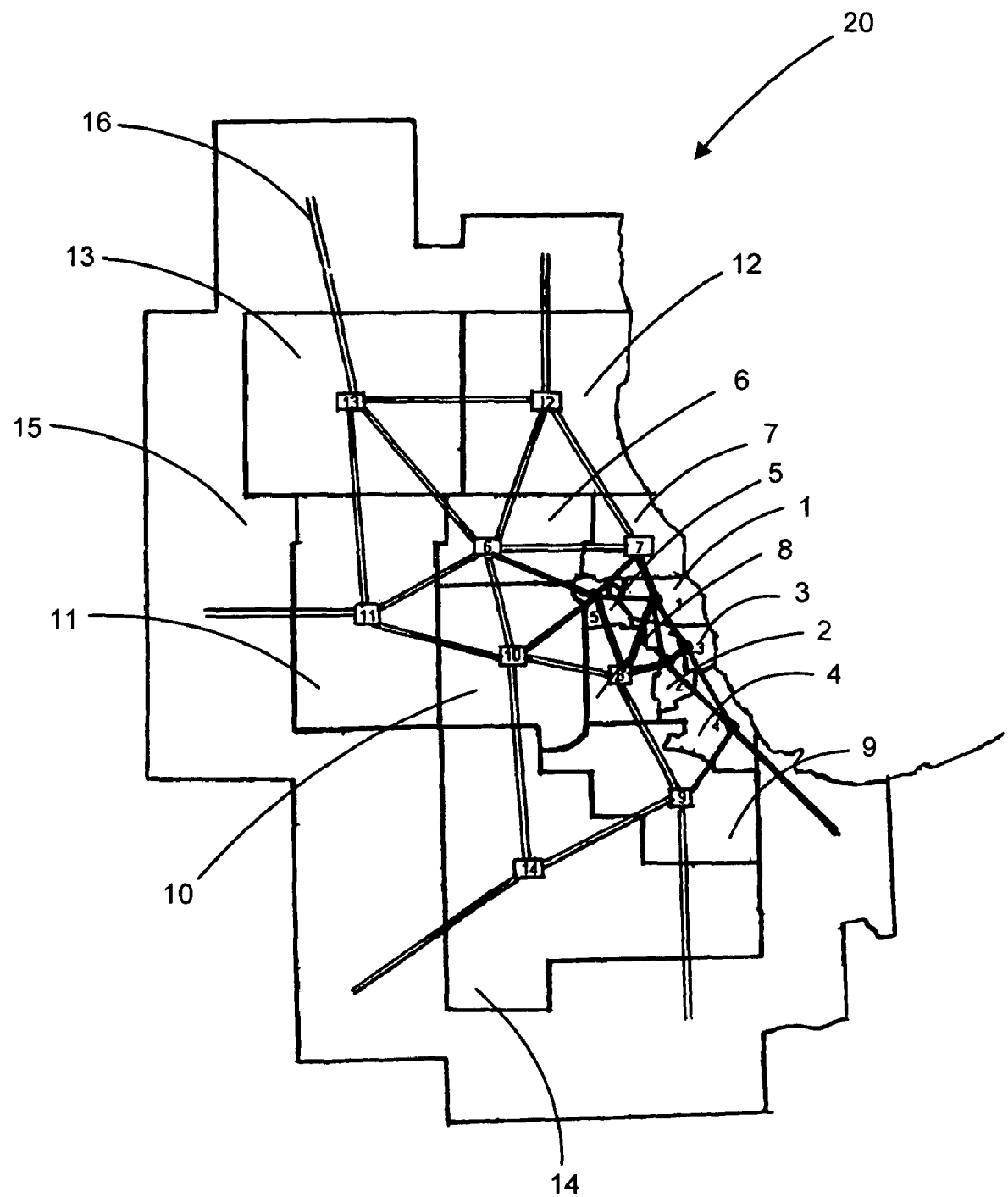
FIG. 1 is a map of Chicago, Ill., United States showing fourteen metropolitan zones and one outer zone substantially enclosing the metropolitan zones.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

As one of ordinary skill in the art appreciates, the term "i.i.d." is defined as a sequence or other collection of random variables that each have the same probability distribution as the others and all are mutually independent. Additionally, "a Gumbel distribution" is defined as a distribution used to find the minimum, or maximum, of a number of samples of various distributions. A "Marshallian demand function" is defined as a function that describes demand given prices p and income w. A Marshallian demand function specifies what the consumer would buy in each price and wealth situation, assuming it perfectly solves the utility maximization problem. Often, the factors considered in Marshallian demand functions are easier to directly observe. As used herein, "Cobb-Douglas" refers to a functional form of production functions used to represent the relationship of output to inputs which typically takes the form $X = A \times L^a \times K^b$, where X is the production quantity of output, A is a constant, L is quantity of labor and K is quantity of capital. Both L and K are used as inputs in the production of X. As used herein, the term "converge" means that during an iterative calculation, a calculated value is substantially equal to the immediately prior calculated value for the same variable, within a tolerance, while "economic zones" means defined geographic areas covering the central city, suburbs and exurban area, or any part thereof.

The following tables are notation glossaries and summarize the subscripts, superscripts and variables used throughout the specification and claims:

| Subscripts/Superscripts | |
| --- | --- |
| Variable | Description |
| $f = 0, 1, 2, 3, 4$ | types of labor and income levels ($f = 0$ is outside labor) |
| $i, j, z = 1 \ldots I,$ $I + 1, \ldots \Im$ | zones (first i are inside zones and the last T are outside zones, with the last zone being the "rest of the world") |
| $k = 0, 1, 2, 3, 4, 5$ | building (real estate asset) types (last two are industrial and commercial, and first two are single family multiple family housing; $k = 0$ denotes land; $k = 5$ denotes outside buildings) |
| $\aleph = 4$ | building types excluding vacant land and outside buildings |
| $r = 1, 2, 3, 4, \ldots 12$ | industries (1: agriculture plus; 2: manufacturing; 3: non-retail services; 4: retail services; 5-8: construction of each building type; and, 9-12: demolition of each building type) |
| $l = 1, 2$ | trip purpose [l = 1 or w is work-purpose (commuting); and, l = 2 or nw is non-work purpose (i.e., shopping etc.) |
| $m = 1, 2, 3$ | modes of travel (1: automobile; 2: transit; and, 3: pedestrian and other) |
| $\tau = 1, 2$ | period of day of travel ($\tau = 1$: peak period; and, $\tau = 2$: off-peak period) |
| $p = 1, 2, 3, 4$ | trip pattern as combination of outbound time of day and inbound time of day (1: peak/peak; 2: peak/off-peak; 3: off-peak/peak; and, off-peak/off-peak) |

| Indices for dimensions of model | |
| --- | --- |
| Variable | Description |
| $\Im$ | number of model zones spanning the region where consumers can locate and businesses produce |
| $\wp$ | number of peripheral zones where consumers can locate and businesses produce, treated as exogenous in the equilibrium |
| $\Im' = \Im + \wp$ | all zones where consumers can locate and businesses produce |
| $\aleph$ | number of building types |
| $\aleph_1$ | number of residential building types |
| $\aleph_2$ | number of commercial building types |
| $\Re$ | number of basic industries in the model |
| F | number of skill levels in the labor market |

| Equilibrating (endogenous) variables (unknowns of the model) | | |
| --- | --- | --- |
| Variable | Name in Code | Description |
| $X_{ri}$ | xoutput (R + 2K, I) | aggregate industry r output produced in zone i |
| $p_{ri}$ | price (R + 2K, I + Out) | price of industry r output produced in zone i |
| $w_{if}$ | wage (F, I + Out) | hourly wage rate paid to skill f labor hired by producers in zone i |
| $\tilde{w}_{if}$ | | hourly after-tax wage received by a skill f consumer |
| $R_{ik}$ | rent (K + 1, I + Out) | rental price of floor space in a type k building in zone j |
| $V_{ik}$ | value (K + 1, I) | asset price of floor space in a type k building in zone j |
| $S_{ik}$ | Stock (K + 1, I) | aggregate stock of floor space in a type k building in zone j |

| Exogenous variables | | |
| --- | --- | --- |
| Variable | Name in Code | Description |
| $J_i$ | Jland (K + 1, I) | aggregate land in model zone i |
| $N_f$ | N(2, F) | number of consumers in skill level f |
| H | H | annual hours available to each consumer for allocation between work and travel |
| d | 250 | commuting and working days per year per person |
| $\Theta$ | Outincome | aggregate income originating from outside the region but accruing to residents within the region |
| $\xi_f$ | xi (F) | share of total aggregate income ($\Lambda + \Theta$) accruing to the region that is owned by skill group f |
| $A_{ri}$ | AA(R + 2K, I) | scale parameter of production function of industry r producing in model zone i |
| $\Xi_{ri}$ | Nexport (R, I) | export demand for product of industry r produced in model zone j |
| $\rho$ | Rho | interest rate or the opportunity cost of capital in the business sector including developers |

Exogenous variables

| Variable | Name in Code | Description |
| --- | --- | --- |
| $m_{ikk'}$ | Mconv(I, K + 1, K + 1) | structural density in units of floor space per unit of land in a type k building (equal to one (1) for vacant land) |
| $D_{iks}$ | Docc (K, I), Dvac (K, I) | maintenance cost of a type k unit floor space in zone i depending on vacancy (s = v) or occupancy (s = o) status |
| $Cost_{ik0}$ | | cost of demolishing a unit amount of type k floor space in a building in model zone i |
| $Cost_{i0k}$ | | cost of constructing a unit amount of floor space in a type k building in model zone i |
| $Cost_{i00}$ | | cost of keeping vacant a unit amount of land in model zone i |
| $Cost_{ikk}$ | | cost of keeping as is a unit amount of floor space in a type k building in model zone i |
| $\tau_{ik}$ | tax (I, K + 1) | ad-valorem property tax per unit of type k floor space in model zone i paid at the end of a year by an investor |
| $I_f$ | Income(F) | income per person corresponding to midpoint of income quartiles (from Census) |
| $\theta_f$ | inctax (2, F) | constant marginal income tax rate levied on the wage and non-wage income of a skill f consumer who is employed |
| $\theta_f^u$ | inctax (2, F) | constant marginal income tax rate levied on the non-wage income of a skill f consumer who is unemployed |
| $\tilde{P}_{ijk\|f}, \tilde{P}_{ik\|f}^u$ | Prob (K1, J + Out, I + Out, F), ProbUOLF(K1, I + Out, F) | choice probabilities of employed and unemployed, extracted in part from Census data |

Consumer - Parameters

| Variable | Name in Code | Description |
| --- | --- | --- |
| $\alpha_f$ | alpha (F) | the elasticity of utility with respect to the subutility of retail goods |
| $\beta_f$ | beta (F) | the elasticity of utility with respect to housing floor space |
| $\eta_f$ | eta (F) | $\frac{1}{1-\eta_f}$ is the elasticity of substitution between any two retail varieties for skill group f |
| $\iota_{z\|iff}, \iota_{z\|if}^u$ | iota (F,I+Out,J+Out,Sh+Out), IotaUOLF (F,I+Out,Sh+Out) | inherent attractiveness of retail location at model zone z for a consumer of skill f residing in model zone i and working in model zone j, or a non-worker |
| $c_{ijk\|f}, c_{ik\|f}^u$ | C (F,I+Out,J+Out), cuolf (F,I+Out) | trips required by consumer of skill f residing in model zone i and working in model zone j to purchase a unit quantity of retail goods |
| $E_{ijk\|f}, E_{ik\|f}^u$ | EU (F,I+Out,K1,J+Out), EUUOLF (F,I+Out,K1) | inherent attractiveness of residence-workplace-housing type location bundle (i, j, k) for consumer of skill f, for both workers and non-workers |
| $\lambda_f$ | Lambda (F) | dispersion parameter of i.i.d. Gumbel idiosyncratic utilities in skill group f |
| $T_{z\|iif}, T_{z\|if}^u$ | Trips(F,2,Sh+Out,I+Out) | retail trips to zone z by a skill f consumer (being a worker in zone j or a non-worker) residing in zone i |
| $\hbar_{m\|ij}$ | | constant effects in mode m choice and trip pattern choices from zone i to zone j |

Consumer - Idiosyncratic variables

| Variable | Description |
| --- | --- |
| $e_{ijk\|f}$ | idiosyncratic utility of residence-workplace-housing type location bundle (i, j, k) for consumer of skill f |

Consumer - Intermediate variables

| Variable | Name in Code | Description |
|---|---|---|
| $U_{ijk|f}$, $U_{ik|f}^u$ | | direct utility of residence-workplace-housing type location bundle (i, j, k) for a consumer of skill f |
| $\tilde{U}_{ijk|f}$ | | common part of the indirect utility of residence-workplace-housing type location bundle (i, j, k) for a consumer of skill f |
| $\Psi_{ijf}$ | Fullincome (F, I, J) | full income of consumer of skill f net of the opportunity cost of commuting and taxes |
| $M_f$ | M(F) | non-wage annual income per consumer of skill level f |
| $\Lambda$ | | aggregate annual non-wage income from assets within the region after subtracting property taxes |
| $\Psi_{z|ijf}$, $\Psi_{z|if}^u$ | psi(F, I + Out, J + Out, Sh + Out), psiUOLF(F, I + Out, Sh + Out) | delivered price (inclusive of the opportunity cost of travel) of retail goods produced in zone z for consumers of skill level f working in model zone j and residing in model zone i |
| $Z_{z|ijf}$, $Z_{z|if}^u$ | Z(F, I + Out, J + Out, Sh + Out), ZUOLF(F, I + Out, Sh + Out) | Marshallian demand for retail goods in model zone z for consumer of skill level f working in model zone j and residing in model zone i |
| $b_{ijk|f}$, $b_{ik|f}^u$ | B(F, I, I, 2), buolf(F, I, 2) | Marshallian demand for floor space in a type k residential building by a worker working in model zone f and residing in model zone i |
| $H_{ijf}$ | Lsupply(F, I) | annual labor hours supplied to producers in model zone j by skill level f consumers who reside in zone i |
| $P_{ijk|f}$, $P_{ik|f}^u$ | NewProb(F, I + Out, K, J + Out), NewProbUOLF(F, I + Out, K) | probability that a skill f consumer will choose to reside in a type k residential building in model zone i while working in model zone j or remaining unemployed (j = 0) |
| $G_{ij}$, $G_{ij}^w$, $G_{ij}^{nw}$ | time (2, 1 + Out, I + Out) | round trip travel time per person-trip from zone i to zone j (>0) by a traveler of skill f including worker and non-worker travelers |
| $g_{ij}$, $g_{ij}^w$, $g_{ij}^{nw}$ | Mcost (2, 1 + Out, I + Out) | round trip monetary cost per person-trip from zone i to zone j (>0) by a traveler of skill f, including worker and non-worker travelers |
| $\pi_{m|ij}$ | | probability that a consumer residing in zone i makes a round trip to zone j (>0) using mode m |

Firm - Parameters

| Variable | Name in Code | Description |
|---|---|---|
| $\nu_r$ | nu (R+2K) | elasticity of output with respect to business capital used in industry r |
| $\delta_r$ | delta (R+2K) | elasticity of output with respect to the group of labor inputs used in industry r |
| $\mu_r$ | mu (R+2K) | elasticity of output with respect to the group of floor space inputs used in industry r |
| $\gamma_{sr}$ | gamma (R+2K,R) | elasticity of output with respect to the group of intermediate inputs from industry s used in industry r |
| $\theta_r$ | theta (R+2K) | $\frac{1}{1-\theta_r}$ is the constant elasticity of substitution among labor inputs used in industry r |
| $\zeta_r$ | Zeta (R+2K) | $\frac{1}{1-\zeta_r}$ is the constant elasticity of substitution among floor space inputs used in industry r |
| $\epsilon_{sr}$ | Epsilon (R+2K) | $\frac{1}{1-\varepsilon_{sr}}$ is the constant elasticity of substitution among intermediate inputs from industry s used in industry r |
| $\kappa_{f|rj}$ | kappa (R+2K,I,F) | inherent attractiveness of labor input of skill f used by industry r in zone j |
| $\chi_{k|rj}$ | chi (R+2K,I,K+1) | inherent attractiveness of floor space of type k used by industry r in zone j |
| $\upsilon_{sn|rj}$ | upsilon (R+2K,I,R+2K,I) | inherent attractiveness of intermediate inputs originating from industry s in zone n used by industry r in zone j |
| $AA_{rj}$ | AA(R+2k,I) | production function scale factor of industry r operating in zone j |
| $\sigma_r$ | sigma (R) | coefficient for converting the monetary cost of personal transport to the monetary cost of transporting a unit amount of the output of industry r |

Firm - Intermediate variables

| Variable | Name in Code | Description |
|---|---|---|
| $\hat{p}_{rjn}$ | ipsilon(I,R,I) | the delivered price of a unit output of industry r produced in model zone j and sold as an |

Firm - Intermediate variables

| Variable | Name in Code | Description |
|---|---|---|
| $K_{rj}$ | | intermediate input to other producers in model zone n business capital used as an input in production by industry r in zone j |
| $L_{f|rj}$ | LDemand(F, R + 2K, I) | labor of skill group f used as an input in production by industry r in zone j |
| $B_{k|rj}$ | BDemand(R + 2K, I, K + 1) | floor space of type k used as an input in production by industry r in zone j |
| $Y_{sn|rj}$ | Yinput(R + 2K, I, R + 2K, I) | output of industry s produced in zone n used as an intermediate input in production by industry r in zone j |

Developers and landlords - Parameters

| Variable | Name in Code | Description |
|---|---|---|
| $\Phi_{ik}$ | phiocc (K, I) | dispersion parameter of i.i.d. Gumbel distributed idiosyncratic maintenance costs for a unit type k floor space in model zone i |
| $\Phi_{i0}$ | | dispersion parameter of i.i.d. Gumbel distributed idiosyncratic |
| $\Phi_{ik}$ | phiconv (K, I) | costs associated with keeping land vacant or constructing on it dispersion parameter of i.i.d. Gumbel distributed idiosyncratic costs associated with keeping a building as is or demolishing it |
| $F_{ik0}, F_{ikk'}$ | EC(K + 1, K + 1) | constant effects of conversions from k to k' |

Developers and landlords - Idiosyncratic variables

| Variable | Description |
|---|---|
| $d_{iks}$ | idiosyncratic maintenance cost of type k unit floor space in zone i depending on vacancy (s = v) or occupancy (s = o) status |
| $\varsigma_{ik0}$ | idiosyncratic cost of demolishing a unit amount of type k floor space in a building in model zone i |
| $\varsigma_{i0k}$ | idiosyncratic cost of constructing a unit amount of floor space in a type k building in model zone i |
| $\varsigma_{i00}$ | idiosyncratic cost of keeping vacant a unit amount of land in model zone i |
| $\varsigma_{ikk}$ | idiosyncratic cost of keeping as is a unit amount of floor space in a type k building in model zone i |

Developers and landlords - Intermediate variables

| Variable | Name in Code | Description |
|---|---|---|
| $\omega_{ik}$ | Omega(K, I) | expected annual profit of a landlord operating a type k unit floor space in model zone i before the idiosyncratic vacancy costs are revealed |
| $q_{ik}$ | Qoccup(K, I) | probability that a landlord operating a type k unit floor space in model zone i will decide to offer it for rent |
| $Q_{ik0}, Q_{i0k}$ | Qconv(I, K + 1, K + 1) | probability that a type k unit floor space in zone i is converted to type k' |
| $\Pi_{ik0}$ | | profit of demolishing a unit amount of type k floor space in a building in model zone i |
| $\Pi_{i0k}$ | | profit of constructing a unit amount of floor space in a type k building in model zone i |
| $\Pi_{i00}$ | | profit of keeping vacant a unit amount of land in model zone i |
| $\Pi_{ikk}$ | | profit of keeping as is a unit amount of floor space in a type k building in model zone i |
| $\aleph_1$ | | probability that a developer in zone i will construct a type k building on a unit vacant land |
| $\aleph_2$ | | probability that a developer in zone i will demolish a unit floor space in a type k building |

A summary of the instant application follows. Section 2 describes the microeconomic structure of the different sectors of Regional Economic and Land Use Model (hereinafter "RELU"). These sectors include consumers, producers, landlords and developers. The government affects the model via income tax rates that can be levied on consumers, ad-valorem property tax rates on each type of building, and additional taxes may be easily introduced. In RELU, consumers make unified, i.e., simultaneously determined, choices of housing type, residential location, job location, labor supply and choose a pattern of non-work trips that originate from the residence location. These choices are consistent with utility maximization under time and money budgets and are also hierarchically linked to the choice of travel mode, e.g., auto, public transit, for each trip and the choice of the minimum cost route on the congested highway network, nested within the travel mode choice.

Section 3 describes the general economic equilibrium of RELU, focusing on the excess demand equations for real estate markets, labor markets, markets for products of each basic, i.e., export-oriented, industry, markets for investment in business and real estate capital, i.e., buildings and land, and the composition of non-wage income. This section discusses how a regional economy is open. To treat this openness, model economic zones are augmented by a number of peripheral zones. The peripheral zones can attract economic activity but are not equilibrated together with the model zones, and therefore rents, wages and prices in the peripheral zones are treated as exogenous. Consumers can locate job or residence in a peripheral zone as well as make trips to a peripheral zone. Firms, locating in model economic zones utilize inputs that originate within the region as well as inputs that are located outside the region. Each model zone also functions as an export zone so that products produced there can be directly shipped to the outside world. The income composition of the metropolitan economy includes non-wage income from assets that can be held in the rest of the world. Section 4 reports on the structure of the transportation model (hereinafter "TRAN"), which is based on Anas and Kim's (1990) formulation of stochastic user equilibrium on highway networks. See Alex Anas and Ikki Kim, *Network Loading versus Equilibrium Estimation of the Stochastic Route Choice Model Maximum Likelihood versus Least Squares Revisited*, Journal of Regional Science, 30, 1, 89-103 (1990).

Section 5 describes the calibration procedure for the RELU-TRAN method, wherein various equation coefficients are determined for use in subsequent stages. Section 6 describes the special block-recursive structure and the precise numerical testing of the unified RELU-TRAN equilibrium-finding algorithm with a fourteen (14) plus one (1) zone version of the Chicago MSA that corresponds to 656 equations. The one additional zone represents a peripheral zone. The algorithm consists of iterations nested within loops and loops nested within cycles. Various conditions were tested, resulting in excellent, smooth convergence results in which the number of loops within successive cycles declined continually. Results also imply a numerically ascertained unique equilibrium solution of the unified model, however there is not a general uniqueness proof. Section 7 discusses the utility of the unified RELU-TRAN model regarding policy analysis and includes ongoing uses of the instant invention.

Section 2. RELU Model Structure

For the following embodiments, the metropolitan area is subdivided into $\Im$ model zones plus $\wp$ peripheral zones representing adjoining areas and beyond, for example, as shown in FIG. 1. All zones are thus denoted as $\Im'=\Im+\wp$. Each of the $\Im$ model zones is a potential site of $k=1 \ldots \aleph_1$ housing types, e.g., single-family and multiple-family type buildings, and $k=1 \ldots \aleph_2$ business building types, e.g., commercial and industrial, and each such zone may also contain some undeveloped land. There are $r=1 \ldots \Re$ interdependent basic industries that can produce in any of the zones and $f=1 \ldots F$ consumer types who can reside in any zone by renting housing there, can work in any zone and can buy retail goods in any zone. For each building type, there are landlords who can rent out the floor space and there is an industry or developer that can construct or demolish floor space. The following is a description of the behavior of consumers, producers, landlords and developers, in view of these interrelationships.

FIG. 1 depicts a map of Chicago, Ill., United States showing fourteen metropolitan zones and one outer zone substantially enclosing the metropolitan zones. As shown in the figure, the city of Chicago comprises metropolitan zones 1, 2, 3, 4, 5, while the suburban areas comprise metropolitan zones 6, 7, 8, 9, 10, 11, 12, 13 and 14, and peripheral zone 15 comprises the exurban areas. Roadways, as exemplified by road 16, represent the aggregation of roadway capacity between interconnected zones. Collectively, zones 1 through 15 and roadways 16 form metropolitan area 20, i.e., the Chicago metropolitan area. The following discussion is best understood in view of FIG. 1.

Section 2a. Consumers

Consumers, who are also potential workers, are exogenously distributed among $f=1 \ldots F$ skill groups. The exogenous number of consumers in skill group f is $N_f$. As used herein, "skill" refers to a consumer's exogenous ability in the labor market, however wage and non-wage incomes for each skill group f are endogenous. Consumers' residences can be located in any zone $i=1 \ldots \Im'$, while consumers' workplaces can be located in any zone $j=1 \ldots \Im'$. Each consumer makes a set of discrete and continuous choices. Without implying any sequence among them, discrete choices may include, but are not limited to, the following examples. A consumer decides whether he will be employed or unemployed, and if employed, in which zone to work. A fictitious, non-spatial "work zone" denoted by $j=0$ is used to represent a voluntary choice of unemployment. Thus, the choice of $j=0$, which entails zero wage income, is instantly accessible to every residence zone i. Thus, a consumer is depicted as choosing among the $j=0, 1 \ldots \Im'$ available zones, including peripheral zones, and this framework incorporates a choice of voluntary unemployment. Additionally, all consumers also choose a zone of residence among the $i=1 \ldots \Im'$ zones. Similarly, all consumers choose from $k=1 \ldots \aleph_1$ housing types, i.e., those housing types available in their zone of residence.

Additional choices include continuous variables and occur based on the above-described discrete choices. For example, in view of work zone, residence zone and housing choices i, j, and k, respectively, consumers choose: (i) the quantity of housing k floor space to rent; (ii) how many hours of labor to supply annually in work zone j at some $j>0$, i.e., if employed; and, (iii) what aggregate annual quantity of retail goods to purchase at each potential retail destination z. It should be noted that in the benchmark RELU model described herein, labor supply is the residual time after the allocation of a time budget to work and non-work trips, while leisure is implicitly fixed. Consequently, an unemployed traveler has no opportunity cost for his time since he does not allocate time to work. The model includes extensions in which leisure and other specifications of time are treated as well as the unemployed value time. This mixed discrete-continuous utility maximization problem is:

$$\text{Max}_{\forall(i,j,k)}\left\{U^*_{ijk|f} \equiv \begin{bmatrix} \text{Max}_{\forall Z_z,b} U_{ijk|f} = \alpha_f \ln\left(\sum_{\forall z} i_{z|ijf}(Z_z)^{\eta_f}\right)^{\frac{1}{\eta_f}} + \\ \beta_f \ln b + E_{ijk|f} + e_{ijk|f} \\ \text{subject to the budget:} \\ \sum_{\forall z}(p_{\mathcal{R}z} + c_{ijf}g_{iz})Z_z + bR_{ik} + \Delta_j dg_{ij} = \\ \Delta_j(1-\vartheta_f)w_{jf}\left(H - dG_{ij} - \sum_{\forall z} c_{ijf} Z_z G_{iz}\right) + \\ [1 - \Delta_j \vartheta_f - (1-\Delta_j)\vartheta^u_f] M_f \\ \text{and } H - \Delta_j d G_{ij} - \sum_{\forall z} c_{ijf} Z_z G_{iz} \geq 0. \end{bmatrix}\right\} \quad (1)$$

As shown in equation (1), for each type f consumer, the discrete choices include the combination of a zone of residence i, a zone of employment j, and housing type k within the zone of residence i. The consumer's continuous choice variables which are conditional on the chosen i, j, and k are floor space b, also referred to as housing size, in the chosen type k housing in zone i, and the quantities of retail goods the consumer purchases from all the $\mathfrak{I}$ zones, i.e., vector $Z \equiv [Z_1 \ldots Z_{\mathfrak{I}}]$, by traveling from his residence in zone i. Please note that "retail" refers to any non-work trip that involves the purchase of any good or service, however trip chains and retail trips that do not originate from home are ignored. If the consumer chooses unemployment, then j=0 and $\Delta_j$=0. If the consumer chooses employment, then j>0 and $\Delta_j$=1. For employed consumers, labor supply is implied by the choices of b and $Z \equiv [Z_1 \ldots Z_{\mathfrak{I}}]$, as described infra.

Turning now to the form of the utility function, i.e., equation (1), and its parameters. It should be noted that equation (1) is Cobb-Douglas between housing and the sub-utility of all retail varieties. Additionally, the consumer views each location as offering a different retail variety. See Alex Anas and Rong Xu, *Congestion, Land Use and Job Dispersion: A General Equilibrium Analysis*, Journal of Urban Economics, 45, 3, 451-473 (1999). Thus, in the Arrow-Debreu tradition, the retail goods available at different locations are viewed as imperfect substitutes by the consumer. However, in the instant invention, retail goods offered in the same zone are viewed as perfect substitutes. Coefficients $\alpha_f$>0, $\beta_f$>0, while $\alpha_f+\beta_f=1$ and they are used to represent the shares of disposable income spent on retail goods and on residential floor space, respectively. $1/(1-\eta_f)$ is the elasticity of substitution between any two retail locations, or retail varieties. The sub-utility of retail varieties has constant elasticity of substitution (hereinafter "C.E.S.") and takes the well known Dixit-Stiglitz form by assuming 0<$\eta_f$<1. See Avinash Dixit and Joseph Stiglitz, *Monopolistic Competition and Optimum Product Diversity*, American Economic Review, 67(3), 297-308 (1977). The consumer is presumed to have an extreme taste for retail varieties in the sense that he will "travel shop" each retail location no matter how high the price of the goods offered there. As one of ordinary skill in the art will recognize, pricier locations will be shopped less frequently. The attenuation of shopping frequency relative to the full price of a retail good and how that full price entails travel time and cost is discussed in greater detail infra. In the utility function, i.e., equation (1), the coefficients $i_{z|ijf} \geq 0$ are constants measuring the inherent attractiveness of the retail location z for consumers who have chosen i, j, and k. In other words, keeping prices constant, a consumer will purchase more from a retail location with a higher inherent attractiveness. By making $i_{z|ijf}$=0, any retail location can be excluded from the retail choice set. $E_{ijk|f} \in (-\infty,+\infty)$ are constant terms, common to all consumers of skill f, that measure the inherent attractiveness of the discrete work zone, residence zone and housing choices, i, j, and k, respectively. Finally, $e_{ijk|f} \in (-\infty,+\infty)$ are idiosyncratic utility constants. As used herein, idiosyncratic utility captures the horizontal taste differentiation among consumers, and it should be noted that it is assumed that idiosyncratic tastes fluctuate for the same consumer from one time-period to another. The distribution of idiosyncratic utility constants over the population of consumers of skill f determines a particular type of discrete choice model.

The following is a discussion of the budget constraint. Prices that are exogenously given to the consumer, but are endogenous in equilibrium, include: rent per unit of floor space of type k in zone i, $R_{ik}$; hourly wage rate paid to skill f labor employed in a zone j>0, $w_{jf}$; and, unit prices of retail goods sold in zone z, $p_{\mathcal{R}z}$. The subscript $\mathcal{R}$ denotes the retail industry. $M_f$ is the given non-wage income of the consumer, which consists of normal investment returns from real estate in the region, i.e., endogenous in the model, as well as income from all sources outside the regional economy, i.e., exogenous to the model. The consumer also takes as a given the unit income tax rates $\theta_f$ and $\theta_f^u$, which are also exogenous to the model. For an employed consumer, earned and non-wage incomes are assumed taxed at the rate $\theta_f$, while the tax rate for an unemployed consumer is assumed to be $\theta_f^u$, which is less than $\theta_f$, and applies to non-wage income only since such a consumer does not have wage income. H is the consumer's total annual time endowment and d is the exogenous number of commutes, i.e., work days, in a year. $c_{ijf}$ are fixed, exogenous coefficients that measure the number of retail trips necessary to purchase one unit of a retail good. $G_{ij}$ is the expected travel time, over all available travel modes, of one round trip from i to j for any consumer and any purpose, i.e., work or non-work, ignoring time-of-day variations in travel times. The corresponding monetary expected travel cost is $g_{ij}$. As discussed infra, these travel times and costs are determined as expected values over travel modes such as highway, public transit and "other modes," and incorporate the efficient, i.e., cost minimizing, choice of routes by consumers who travel over congested highway networks. It is assumed that when the consumer makes location decisions, it is not know which mode of travel, trip pattern and network routes that will be chosen on any given day, or equivalently, that over a year each available mode will be chosen with some known probability. At this stage of the model, i.e., equation (1), the expected travel times and monetary costs over all modes, trip patterns and routes are taken as given conditional on each choice of i and j.

The next step is to rewrite the budget constraint so that, for the employed and hence for commuters, the delivered price paid for a unit retail good includes the value of time spent in retail trips. It should be noted that the above budget formulation reveals that time is assumed valued at the after-tax wage rate of the traveler. Since the unemployed do not have wages, it is assumed here that their value of time for location and retail travel choices is zero. Hence, for an unemployed traveler, the delivered price of a retail good purchased in zone z consists of that good's sales price at z plus only the monetary travel cost required to purchase one unit. In view of the foregoing, the budget constraint portion of equation (1) is rearranged so that it reads:

$$\sum_{\forall z} [p_{Rz} + c_{ijf}(g_{iz} + \Delta_j(1-\vartheta_f)w_{jf}G_{iz})]Z_z + bR_{ik} = \quad (2)$$

$$\Delta_j(1-\vartheta_f)w_{jf}(H - dG_{ij}) + [1 - \Delta_j\vartheta_f - (1-\Delta_j)\vartheta_f^u]M_f - \Delta_j dg_{ij}.$$

In equation (2), the full delivered price of a retail good z for a consumer of type f residing in zone i and working in zone j is:

$$\Psi_{z|ijf} = p\Re_z + c_{ijf}(g_{iz} + \Delta_j(1-\theta_f)w_{jf}G_{iz}) \quad (3)$$

The right side of budget equation (2) is defined as the full after-tax income of the consumer net of commuting expenditures inclusive of the value of time spent commuting. More briefly, this is net full income:

$$\Psi_{ijf} = \Delta_j(1-\theta_f)w_{jf}(H-dG_{ij}) + [1-\Delta_j\theta_f - (1-\Delta_j)\theta_f^u]M_f - \Delta_j dg_{ij}. \quad (4)$$

The word "net" expresses the fact that the full income is net of taxes as well as net of commuting costs. The word "full" expresses the fact that this income is what the consumer would have if he spent his entire net of commuting cost as time working. One of ordinary skill in the art will recognize that actual money income from wages is lower because the consumer must take time away from potential work to make his retail trips.

For each i, j, and k, the Marshallian demands of the consumer that are the solution to the continuous choices in the utility maximization problem of equation (1) are:

$$b_{ijk|f} = \beta_f \frac{\Psi_{ijf}}{R_{ik}} \quad (5)$$

and, $$Z_{z|ijf} = \frac{\iota_{z|ijf}^{\frac{1}{1-\eta_f}} \psi_{z|ijf}^{\frac{1}{\eta_f-1}}}{\sum_{\forall s} \iota_{s|ijf}^{\frac{1}{1-\eta_f}} \psi_{s|ijf}^{\frac{1}{\eta_f-1}}} \alpha_f \Psi_{ijf} \quad (6)$$

With these utility maximizing choices, each employed consumer also determines his annual labor supply ($H_{ijf}$ in hours, for j>0) to the chosen labor market at zone j by subtracting his total travel time spent on commutes and retail trips from his annual time endowment. This calculation yields:

$$H_{ijf} = H - dG_{ij} - \sum_{\forall z} c_{ijf} Z_{z|ijf} G_{iz} \geq 0. \quad (7)$$

The next step is to evaluate the direct utility function at the maximized choices of floor space and retail quantities to get the indirect utility function which takes the form $U^*_{ijk|f} = \tilde{U}_{ijk|f} + e_{ijk|f}$ where the non-idiosyncratic part includes:

$$\tilde{U}_{ijk|f} = \alpha_f \ln \alpha_f + \beta_f \ln \beta_f + \ln \Psi_{ijf} - \quad (8)$$

$$\beta_f \ln R_{ik} + \frac{\alpha_f(1-\eta_f)}{\eta_f} \ln \left( \sum_{\forall s} \iota_{z|ijf}^{\frac{1}{1-\eta_f}} \psi_{z|ijf}^{\frac{\eta_f}{\eta_f-1}} \right) + E_{ijk|f}$$

The final step requires the specification of the distribution of idiosyncratic utilities in order to derive the probability that a randomly selected consumer will choose a discrete state of i, j, and k. It is possible to derive generalized probit or nested logit models by assuming alternative correlation structures among the idiosyncratic utilities of the discrete alternatives. Such nested specifications may prove to be the best in future empirical applications. However, at the present, it is assumed that for each skill group f, $e_{ijk|f}$~i.i.d. Gumbel with dispersion parameter $\lambda_f$. This assumption gives rise to the well-known multinomial logit choice probabilities:

$$P_{ijk|f} = \frac{\exp(\lambda_f \tilde{U}_{ijk|f})}{\sum_{\forall (s,t,n)} \exp(\lambda_f \tilde{U}_{sin|f})}, \sum_{\forall (i,j,k)} P_{ijk|f} = 1 \quad (9)$$

Once consumers choose among the discrete states i, j, and k, including j=0, they must make mode choice decisions. In the embodiments discussed herein, it is presumed that there are three modes m available for both commuting and retail trips, i.e., m=1 for auto, m=2 for transit and m=3 for other. These mode choice decisions are treated in the TRAN portion of the method of the instant invention and not in the RELU portion. Thus, mode choice decisions are presented below in Section 4, i.e., the TRAN portion.

Section 2b. Producers

Our treatment of industry structure and inter-industry interactions extends that which is developed in the prior art, for example, where industries were assumed to have Cobb-Douglas constant returns production functions with all inputs being essential in production. See Alex Anas and Ikki Kim, *General Equilibrium Models of Polycentric Urban Land Use with Endogenous Congestion and Job Agglomeration*, 40 Journal of Urban Economics 232, 232-256 (1996). In the instant invention, the method has been generalized to a technology in which the inputs are groups of labor, buildings and intermediate inputs from the other industries as well as business capital. The instant invention also includes inputs of each type that may be located in other regions. It is presumed that business capital is perfectly elastically supplied and need not be local to the region. Within each group, individual inputs, e.g., intermediate inputs originating from specific zones, are treated as closely related imperfect substitutes with a constant elasticity of substitution. Across business capital and input groups, the overall production function is Cobb-Douglas and constant returns to scale so that firm size and the number of firms in an industry will be indeterminate, but industry output in each model zone will be determined.

Each industry can potentially produce in every zone of the model and can import its inputs of any input group, except buildings, from all other zones. See Alex Anas and Ikki Kim, *General Equilibrium Models of Polycentric Urban Land Use with Endogenous Congestion and Job Agglomeration*, 40 Journal of Urban Economics 232, 232-256 (1996). There are r=1 . . . $\Re$ basic industries. As used herein, basic industry means exporting industry and, in the instant invention, includes retail trade because retail goods can also be exported, or imported, as is true in modern cities. The first $\Re-1$ of these basic industries are defined as industries producing various goods and services that are either exported from the region or are sold as intermediate inputs to other industries producing within the region. Agriculture, manufacturing and business services would be highly aggregated examples. The $\Re$th basic industry is retail trade, as discussed supra in Section 2a relative to the consumer side. Retail trade obtains intermediate inputs from the first $\Re-1$ industries, however it exports part of its output or sells it only to consumers within the region. In addition to intermediate inputs, the basic industries also use primary inputs. These include business capital, labor of each skill level, and floor space in each type of building except residential.

In addition to the basic industries, two specialized industries for each building type are also defined. Thus there are $2\aleph$ such industries where $\aleph=\aleph_1+\aleph_2$. One of these industries provides construction, while the other provides demolition, of that type of building. It is assumed that these industries (hereinafter "con-dem industries") use the primary inputs as well as inputs from potentially all basic industries, and sell their services, i.e., construction and demolition, only to building developers who are described in greater detail infra.

The production function of the rth industry, where $r=1\ldots\Re+2\aleph$, with output $X_{rj}$, and located in zone j is:

$$X_{rj} = A_{rj} K^{\nu_r} \left( \sum_{f=0}^{F} \kappa_{f|rj} L_f^{\theta_r} \right)^{\frac{\delta_r}{\theta_r}} \left( \sum_{k=0}^{\aleph} \chi_{k|rj} B_k^{\zeta_r} \right)^{\frac{\mu_r}{\zeta_r}} \prod_{s=1}^{R} \left( \sum_{n=0}^{\mathcal{J}'} \upsilon_{sn|rj} Y_{sn}^{\varepsilon_{sr}} \right)^{\frac{\gamma_{sr}}{\varepsilon_{sr}}}. \tag{10}$$

This function is Cobb-Douglas and is rendered constant returns by $$\nu_r + \delta_r + \mu_r + \sum_{s=1}^{R} \gamma_{sr} = 1.$$

Each of these positive coefficients will be the cost share of the respective group of inputs. For example, K is business capital with cost-share $\nu_r$. The first group of inputs, $L_f$, with collective cost share $\delta_r$, is labor. The firm can hire all skills of labor and the elasticity of substitution between any two skills is $1/(1-\theta_r)>1$. f=0 represents labor hired by the firm but located outside the region that contributes to production in this region. The second group of inputs, $B_k$, is buildings with cost share $\mu_r$ and elasticity of substitution $1/(1-\mu_r)>1$. k=0 represents buildings rented by the firm outside the region that contribute to production in this region. Additionally, there are also $\Re$ input groups, $Y_{sn}$, one for each group of intermediate inputs received from a basic industry s, which includes industry r itself, since a product can be used as an input in its own production. It is assumed that as an industry r uses inputs from any other industry s, it can get such inputs from potentially any zone n where industry s produces, because outputs of the same industry s produced in different model zones n=0, 1 ... $\mathcal{J}'$ are imperfectly substitutable intermediate inputs as per the assumption of trade theory. See P. S. Armington, *The Geographic Pattern of Trade and the Effects of Price Changes*, 17 IMF Staff Papers 488, 488-523 (1969). The cost-share of the receiving industry r for the inputs received from basic industry s is $\gamma_{sr}$ and the elasticity of substitution for the sth group is $1/(1-\in_{sr})>1$. n=0 represents intermediate inputs purchased and located outside the region that contribute to production. It should be appreciated that the input-specific constants $\kappa_{f|rj}, \chi_{k|rj}, \upsilon_{sn|rj} \geq 0$ permit the specification of input-specific biases including the case of zero values to rule out specific inputs, for example, if businesses do not use residential buildings, $\chi_{k|rj}$ is set to zero (0) when k stands for residential building. The leading scale factor, $A_{rj}$, is a constant that may vary not only by industry but also by location in order to account for place-specific Hicksian-neutral productivity effects.

Each firm solves the following cost minimization problem:

$$\text{Min}_{K,[L_f],[B_k],[Y_1],\ldots,[Y_R]} \rho K + \sum_{f=0}^{F} w_{jf} L_f + \sum_{k=0}^{\aleph} R_{jk} B_k + \sum_{s=1}^{R} \sum_{n=0}^{\mathcal{J}'} (p_{sn} + \sigma_s g_{nj}) Y_{sn} \tag{11}$$

subject to a target output $X_{rj}$ given by the production function equation (10). $p_{sn}$ is the price of the output sold at the place of production s and $\hat{p}_{snj} \equiv p_{sn} + \sigma_s g_{nj}$ is the delivered price of the same output purchased by other producers located at some zone j. As $g_{nj}$ is the monetary cost of commuting from zone n to zone j, $\sigma_s$ is a factor that converts this passenger transport cost to the monetary cost of freight transport per unit of industry s output. One of ordinary skill in the art will appreciate that freight cost congestion could also be modeled explicitly as related to the flow of intermediate goods between zones, however this is ignored in the present invention. $\rho$ is the exogenous price of business capital, i.e., the real interest rate, and, as discussed above, $w_{jf}$ are hourly wage rates per unit of labor and $R_{jk}$ are rents per unit of floor space. Firms are competitive in all markets and take all these prices as given.

The choice of inputs expressed as the conditional input demand functions of industry $r=1 \ldots \Re+2\aleph$ producing in zone j are as follows:

$$K_{rj} = \left(\frac{1}{\rho}\right) \nu_r p_{rj} X_{rj} \tag{12}$$

$$L_{f|rj} = \frac{\kappa_{f|rj}^{\frac{1}{1-\theta_r}} w_{jf}^{\frac{1}{\theta_r-1}}}{\sum_{z=0}^{F} \kappa_{z|rj}^{\frac{1}{1-\theta_r}} w_{jz}^{\frac{\theta}{\theta_r-1}}} \delta_r p_{rj} X_{rj} \tag{13}$$

$$B_{k|rj} = \frac{\chi_{k|rj}^{\frac{1}{1-\zeta_r}} R_{jk}^{\frac{1}{\zeta_r-1}}}{\sum_{z=0}^{N_2} \chi_{z|rj}^{\frac{1}{1-\zeta_r}} R_{jz}^{\frac{\zeta_r}{\zeta_r-1}}} \mu_r p_{rj} X_{rj} \tag{14}$$

$$Y_{sn|rj} = \frac{\upsilon_{sn|rj}^{\frac{1}{1-\varepsilon_{sr}}} \hat{p}_{snj}^{\frac{1}{\varepsilon_{sr}-1}}}{\sum_{y=0}^{\mathcal{J}'} \upsilon_{sy|rj}^{\frac{1}{1-\varepsilon_{sr}}} \hat{p}_{syj}^{\frac{\varepsilon_{sr}}{\varepsilon_{sr}-1}}} \gamma_{sr} p_{rj} X_{rj} \tag{15}$$

It has been found to be beneficial to interpret the inter-industry demands from the perspective of input-output analysis. The intermediate inputs flows, $Y_{sn|rj}$, from industry s in zone n to the receiving industry r in zone j, divided by the output, $X_{rj}$, of the receiving industry yields the physical inter-industry input-output coefficients. These are:

$$a_{sn \to rj} \equiv \frac{Y_{sn|rj}}{X_{rj}} = \frac{\upsilon_{sn|rj}^{\frac{1}{1-\varepsilon_{sr}}} \hat{p}_{snj}^{\frac{1}{\varepsilon_{sr}-1}}}{\sum_{y=0}^{\mathcal{J}'} \upsilon_{sy|rj}^{\frac{1}{1-\varepsilon_{sr}}} \hat{p}_{syj}^{\frac{\varepsilon_{sr}}{\varepsilon_{sr}-1}}} \gamma_{sr} p_{rj} \tag{16}$$

On the other hand, the value-based inter-industry input-output coefficients, are:

$$a_{sn \to rj} \equiv \frac{\hat{p}_{snj} Y_{sn|rj}}{p_{rj} X_{rj}} \quad (17)$$

$$= a_{sn \to rj} \frac{\hat{p}_{snj}}{p_{rj}}$$

$$= \frac{v_{sn|rj}^{\frac{1}{1-\varepsilon_{sr}}} \hat{p}_{snj}^{\frac{\varepsilon_{sr}}{\varepsilon_{sr}-1}}}{\sum_{y=0}^{\mathcal{J}'} v_{sy|rj}^{\frac{1}{1-\varepsilon_{sr}}} \hat{p}_{syj}^{\frac{\varepsilon_{sr}}{\varepsilon_{sr}-1}}} \gamma_{sr} < 1; \sum_{s=1}^{\mathcal{R}} \sum_{n=0}^{\mathcal{J}'} a_{sn \to rj}$$

$$= \sum_{s=1}^{\mathcal{R}} \gamma_{sr} < 1.$$

There are at least three striking contrasts between the present invention general equilibrium approach and traditional input-output models. First, the present invention assumes technology is not Leontieff but, as described supra, a Cobb-Douglas technology with C.E.S. sub-production functions. Second, the present invention value-based inter-industry coefficients are not fixed but variable, i.e., they reflect fully the effects of changing product prices in both the receiving and sending industries, so that ceteris paribus less is purchased from a far away location rather than a close-by input location. Third, as discussed in greater detail infra, both final demands for products and industry demands for primary factors are fully endogenous. Contrarily, in conventional input-output analysis, final demands are treated as exogenous and the demands for primary inputs are computed as gross residuals after inter-industry demands are found.

Since constant returns to scale is assumed to prevail, substitution of the conditional demands set forth in equations (12) through (15), into the direct cost expression of equation (11), gives the result that the industry, and any firm, makes zero profit at any level of output. The zero profit condition has the constant-returns property that the price equals average or marginal cost, independent of the level of output.

withhold it from the rental market. In view of the foregoing, let $D_{iko} - d_{iko}$ and $D_{ikv} - d_{ikv}$ be the costs of maintenance that will be incurred on a unit floor space in zone i in the event that it is occupied by a tenant versus in the event that it is vacant. $D_{iko}$ and $D_{ikv}$ are the costs that are common to all landlords of type k buildings in zone i and $(d_{iko}, d_{ikv}) \in (-\infty, +\infty)$ are i.i.d. Gumbel idiosyncratic costs that vary across these landlords with dispersion parameter $\phi_{ik}$. Then, each landlord in each time period maximizes profit by comparing the revenue obtained under occupancy, $R_{ik} - D_{iko} + d_{iko}$, and that accruing under vacancy, $-D_{ikv} + d_{ikv}$. The decision is resolved differently by each landlord depending on that period's draw of the idiosyncratic cost. Let $q_{ik}$ be the probability that the landlord will decide to let a unit amount of space be occupied. From the binomial logit calculus, this probability is:

$$q_{ik}(R_{ik}) = \frac{\exp[\phi_{ik}(R_{ik} - D_{iko})]}{\exp[\phi_{ik}(R_{ik} - D_{iko})] + \exp[\phi_{ik}(-D_{ikv})]} \quad (19)$$

while $1 - q_{ik}$ is the probability that the unit floor space will remain vacant. In the very beginning of the time period, before idiosyncratic uncertainty is resolved, landlords do not yet know if they will opt for vacancy or occupancy, hence the expected rental profit from a unit amount of floor space is:

$$\omega_{ik}(R_{ik}) = \frac{1}{\phi_{ik}} \ln(\exp[\phi_{ik}(R_{ik} - D_{iko})] + \exp[\phi_{ik}(-D_{ikv})]) \quad (20)$$

which also follows from the binomial logit calculus. The rental on vacant land is taken as exogenous.

Section 2d. Developers

In this embodiment of the present invention, the behavior of developers is a slight simplification of that in the perfect foresight dynamic model of Anas and Arnott. See Alex Anas and Richard J. Arnott, *Dynamic Housing Market Equilibrium with Taste Heterogeneity, Idiosyncratic Perfect Foresight and Stock Conversions*, Journal of Housing Economics, 1, 1, 2-32 (1991); Alex Anas and Richard J. Arnott, *Taxes and Allow-*

$$p_{rj} = \frac{\rho^{v_r}}{A_{rj} \delta_r^{\delta_r} \mu_r^{\mu_r} v_r^{v_r} \left( \prod_{s=1}^{\mathcal{R}} \gamma_{sr}^{\gamma_{sr}} \right)} \left( \sum_{f=0}^{F} \kappa_{f|rj}^{\frac{1}{1-\theta_r}} w_{jf}^{\frac{\theta_r}{\theta_r-1}} \right)^{\frac{\delta_r(\theta_r-1)}{\theta_r}} \left( \sum_{k=0}^{N} \chi_{k|rj}^{\frac{1}{1-\zeta_r}} R_{jk}^{\frac{\zeta_r}{\zeta_r-1}} \right)^{\frac{\mu_r(\zeta_r-1)}{\zeta_r}} \times \prod_{s=1}^{\mathcal{R}} \left( \sum_{y=0}^{\mathcal{J}'} v_{sy|rj}^{\frac{1}{1-\varepsilon_{sr}}} \hat{p}_{syj}^{\frac{\varepsilon_{sr}}{\varepsilon_{sr}-1}} \right)^{\frac{\gamma_{sr}(\varepsilon_{sr}-1)}{\varepsilon_{sr}}} \quad (18)$$

Section 2c. Landlords

The present invention model of landlord behavior is derived from the Anas and Anas/Arnott models. See Alex Anas and Richard J. Arnott, *Dynamic Housing Market Equilibrium with Taste Heterogeneity, Idiosyncratic Perfect Foresight and Stock Conversions*, Journal of Housing Economics, 1, 1, 2-32 (1991); Alex Anas and Richard J. Arnott, *Taxes and Allowances in a Dynamic Equilibrium Model of Urban Housing Market with a Size-Quality Hierarchy*, 27 Regional Science and Urban Economics 547, 547-580 (1997). The modified model determines the short run supply of floor space in buildings that will be kept vacant at market rents. For this purpose, residential and commercial buildings are combined into k=1 ... ℵ types where ℵ=ℵ₁+ℵ₂. A landlord operates floor space in buildings by maximizing profit under perfect competition. The only decision a landlord takes in this model is whether to offer a unit amount of floor space for rent or

*ances in a Dynamic Equilibrium Model of Urban Housing Market with a Size-Quality Hierarchy*, 27 Regional Science and Urban Economics 547, 547-580 (1997). Since there is perfect foresight, the year-end asset prices fully reflect the future and a developer can be modeled as looking forward one-year at a time. As explained above, developers buy the services of specialized, i.e., non-basic, industries that construct or demolish buildings. Although, some models contemplate making direct conversions from one building type to another without demolition, this has been ignored in the present invention. Developers are treated as profit maximizing and competitive firms taking building asset prices, unit construction and demolition prices and other costs as given. Developers determine how much of a given amount of land should remain vacant and therefore available for the future, or if a particular type of building should be built on it. In this way, developers determine structural density on individual lots and on the aggregate. The instant invention assumes that the structural densities of the k=1 ... ℵ building types are predetermined. Letting $m_k$ be the exogenous structural density, i.e., square feet of floor space per acre of lot size of building type k, yields that for each square foot of such floor space that is constructed, $1/m_k$ acres of land are used up. Contrarily, for each square foot demolished, $1/m_k$ acres of land are freed up becoming land available for future construction.

Developers face construction industry and demolition industry prices per unit floor space represented by $p_{\Re+k,i}$ for construction and $p_{\Re+\aleph+k,i}$ for demolition. In addition, developers operating in zone i face unit per acre non-financial costs, for example, $Cost_{iOk}$, for construction and unit per square foot non-financial costs and $Cost_{ikO}$, for demolition of a type k building. In the instant invention, $Cost_{iOO}=0$, while $\zeta_{iOk}$ and $\zeta_{ikO}$ are the uncertain, i.e., fluctuating, non-financial idiosyncratic costs so that total non-financial costs are: $Cost_{iOk}-\zeta_{iOk}$ for construction and $Cost_{ikO}-\zeta_{ikO}$ for demolition. It has been found, and therefore included in the instant invention, that developers are risk neutral. Thus, there is a one-period lag required for any construction, or demolition, to take place. Developers buy vacant land, or a building, in the beginning of a period, then act as a landlord to operate the asset for rental during that period and decide by the end of that period whether and what kind of building to build, or whether to demolish an existing building. This decision depends on what value of the uncertain idiosyncratic costs will be realized for a particular developer before the end of the year. Hence, when they bid for assets, developers are bidding with perfect foresight about prices but with risk neutrality about the idiosyncratic uncertainty in costs.

Let $V_{ik}$ be the stationary state market price per unit of floor space or land of a type k real estate asset, i.e., building, in zone i. k=0 denotes vacant land as an asset, while k>0 represents each of the building types in the present invention model. The capital gains discounted to the beginning of a time period, for keeping the land undeveloped is represented by equation (21a) below, for constructing a type k building on the land is represented by equation (21b), while for keeping a building unchanged is represented by equation (21c) and for demolishing a type k building is represented by equation (21d). Using a real interest rate ρ, the aforementioned equations are as follows:

$$\Pi_{i00} = \frac{1}{1+\rho}V_{i0} + \varsigma_{i00} - V_{i0} \qquad (21a)$$

$$\Pi_{i0k} = \frac{1}{1+\rho}(V_{ik} - p_{\Re+k,i})m_k - Cost_{i0k} + \varsigma_{i0k} - V_{i0} \qquad (21b)$$

$$\Pi_{ikk} = \frac{1}{1+\rho}V_{ik} - Cost_{ikk} + \varsigma_{ikk} - V_{ik} \qquad (21c)$$

$$\Pi_{ik0} = \frac{1}{1+\rho}\left(\frac{V_{i0}}{m_k} - p_{\Re+\aleph+k,i}\right) - Cost_{ik0} + \varsigma_{ik0} - V_{ik} \qquad (21d)$$

It should be noted that the present invention assumes non-financial idiosyncratic construction costs for each i, $(\varsigma_{i00},\varsigma_{i0k};\; k=1\ldots K)\in(-\infty,+\infty)$~i.i.d. Gumbel with dispersion coefficient $\Phi_{i0}$ and also that for each (i, k) the idiosyncratic demolition costs $(\varsigma_{ikk},\varsigma_{ik0})\in(-\infty,+\infty)$~i.i.d. Gumbel with dispersion coefficient $\Phi_{ik}$. Thus, if a profit maximizing developer has bought a unit amount of land, he will build a type k building on that land when $\Pi_{i0k}>\Pi_{i00}$. The probability that this will occur is the (ℵ+1) nomial logit equation (22a). In other words, for any building type (k>0):

$$Q_{i0k}(V_{i0}, V_{i1}, \ldots V_{i\aleph}) = \frac{\exp\Phi_{i0}\left[\frac{1}{1+\rho}(V_{ik} - p_{\Re+k,i})m_k - Cost_{i0k}\right]}{\exp\left[\frac{1}{1+\rho}\Phi_{i0}V_{i0}\right] + \sum_{s=1\ldots\aleph}\exp\Phi_{i0}\left[\frac{1}{1+\rho}(V_{is} - p_{\Re+s,i})m_k - Cost_{i0s}\right]} \qquad (22a)$$

If the profit maximizing developer owns a type k building, he will demolish if $\Pi_{ik0}>\Pi_{ikk}$. The probability that this will occur is the binomial logit:

$$Q_{ik0}(V_{i0}, V_{ik}) = \frac{\left(\exp\Phi_{ik}\left[\frac{1}{1+\rho}\left(V_{i0}\frac{1}{m_k} - p_{\Re+\aleph+k,i}\right) - Cost_{ik0}\right]\right)}{\exp\Phi_{ik}\left[\frac{1}{1+\rho}\left(V_{i0}\frac{1}{m_k} - p_{\Re+\aleph+k,i}\right) - Cost_{ik0}\right] + \exp\Phi_{ik}\left[\frac{1}{1+\rho}V_{ik} - Cost_{ikk}\right]} \qquad (22b)$$

For investors in land to make zero ex-ante expected economic profits, i.e., normal profits, after collecting the rent at the start of the year and paying year-end property taxes at the ad-valorem tax rate $\tau_{i0}$:

$$E[\max(\Pi_{i00}, \Pi_{i0k}; k=1\ldots\aleph)] + R_{i0} - \frac{1}{1+\rho}\tau_{i0}V_{i0} = 0 \qquad (22c)$$

where $R_{i0}$ is the exogenous rent on vacant land. The expectation, $E[\bullet]$ is known from the logit calculus to be:

$$\left(\frac{1}{\Phi_{i0}}\right)\ln\left(\exp\left[\frac{1}{1+\rho}\Phi_{i0}V_{i0}\right] + \sum_{s=1\ldots\aleph}\exp\Phi_{i0}\left[\frac{1}{1+\rho}\left(\frac{V_{is}-}{p_{\Re+s,i}}\right)m_k - Cost_{i0s}\right]\right) - V_{i0} \qquad (22d)$$

Solving the zero profit condition for the start-of-the-year asset bid price, the instant invention yields the asset price for land, $V_{iO}$, that maintains a normal return on land. The equation gives the gross of tax asset bid price discounted to the start of the year as follows:

$$\frac{1+\rho+\tau_{i0}}{1+\rho}V_{i0} = R_{i0} + \frac{1}{\Phi_{i0}}\ln\left\{\exp\Phi_{i0}\frac{1}{1+\rho}V_{i0} + \sum_{s=1\ldots\aleph}\exp\Phi_{i0}\left[\frac{1}{1+\rho}\left(\frac{V_{is}-}{p_{\Re+s,i}}\right)m_s - Cost_{i0s}\right]\right\} \qquad (23a)$$

For investors in type k buildings $$E[\max(\Pi_{kk}, \Pi_{k0})] + \omega_{ik}(R_{ik}) - \frac{1}{1+\rho}\tau_{ik}V_{ik} = 0$$

is the zero profit condition. E [•] is known from the logit calculus to be:

$$\left(\frac{1}{\Phi_{ik}}\right)\ln\left(\exp\Phi_{ik}\left[\frac{1}{1+\rho}\left(V_{i0}\frac{1}{m_k} - p_{\mathcal{R}+\aleph+k,i}\right) - Cost_{ik0}\right] + \exp\Phi_{ik}\left[\frac{1}{1+\rho}V_{ik} - Cost_{ikk}\right]\right) - V_{ik} \quad (23b)$$

Solving the zero profit condition for the gross of tax start of the year asset bid price the present invention yields:

$$\frac{1+\rho+\tau_{ik}}{1+\rho}V_{ik} = \omega_{ik}(R_{ik}) + \frac{1}{\Phi_{ik}}\ln\left\{\exp\Phi_{ik}\left(\frac{1}{1+\rho}V_{ik} - Cost_{ikk}\right) + \exp\Phi_{ik}\left[\frac{1}{1+\rho}\left(V_{i0}\frac{1}{m_k} - p_{\mathcal{R}+\aleph+k,i}\right) - Cost_{ik0}\right]\right\} \quad (23c)$$

Section 3. General Equilibrium of RELU

General equilibrium of the RELU model requires that five sets of conditions be satisfied conditional on G and g, i.e., the expected travel times and travel monetary costs between any zone pairs, respectively. G and g are generated by TRAN, as discussed in Section 4 herebelow. The five sets of conditions include:

(1) That all consumers maximize utility, all producers minimize cost and all landlords and developers maximize profits given the relevant exogenous or endogenous prices and given the expected travel times G and monetary travel costs g;

(2) Because producers are competitive and operate under constant returns to scale, they earn zero economic profits, i.e., the product price covers the unit production cost which equals average and marginal cost;

(3) That all real estate investors earn normal after-tax expected profits, i.e., zero economic profits, after competitive bidding on assets and after receiving rents and accrued capital gains and incurring construction or demolition costs;

(4) That non-wage incomes are consistent with regional building stocks, asset prices and other sources of income from anywhere; and, (5) That all markets clear with zero excess demands, requiring that: (i) there be zero excess demands in the residential and commercial markets for floor space and land in each zone of the model; (ii) there be zero excess demand in the labor market for each skill group in each zone of the model; and, (iii) the aggregate output produced by each primary industry in each zone is sufficient to meet exports and inter-industry demands for the product and, in the case of retail trade, sufficient to meet consumer demands and exports.

This section presents the equations that must hold for the above conditions to be satisfied. At the onset, it is useful to describe some notational choices. First, the unknowns vectors that will be solved to satisfy general equilibrium must be identified. These are the vectors of: product prices p; wages w; rents R; industry outputs X; real estate asset prices V; and, stationary real estate stocks S. Additionally, the matrices of expected travel times G and expected travel monetary costs g are described. A subscript on any vector denotes a sub-vector. For example, $w_j = [w_{j1} \ldots w_{jF}]$, is the wage sub-vector for the labor market in zone j, $R_j = [R_{j1} \ldots R_{j\aleph}]$ is the sub-vector of building rents in zone j. $p_{\mathcal{R}} = [p_{\mathcal{R}1} \ldots p_{\mathcal{R}\mathfrak{I}}]$ is the sub-vector of retail prices in all model zones, while $p_s = [p_{s1}, \ldots, p_{s\mathfrak{I}}]$ is the sub-vector of the mill prices of industry s in all model zones. $G = [G_{ij}]$ and $g = [g_{ij}]$ are the full matrices of inter-zonal expected travel times and monetary costs, respectively, while $G_i = [G_{i1}, \ldots, G_{i\mathfrak{I}}]$, $g_i = [g_{i1}, \ldots, g_{i\mathfrak{I}}]$ and $_ig = [g_{1i}, \ldots, g_{\mathfrak{I}i}]$ are the sub-vectors of round-trip expected travel times, expected monetary costs from zone i to all other zones and expected monetary costs from all other zones to zone i, respectively.

The following functions, which were derived above, are the building blocks of the general equilibrium of the instant invention. The equations are shown here in shorthand notation as functions of endogenous variables and G and g, suppressing other parameters and exogenous variables. These are the conditional input demands of producers for labor, buildings and intermediate goods: $L_{f|rj}(p_{rj}, X_{rj}, w_j)$, $B_{k|rj}(p_{rj}, X_{rj}, R_j)$ and $Y_{sn|rj}(X_{rj}, p_{rj}, p_s, _jg)$, and the unit cost functions $p_{ri}(p, w_i, R_i, _ig)$. For the consumer, the demands for floor space and retail goods are $b_{ijk|f}(R_{ik}, w_{jf}, M_f, G_{ij}, g_{ij})$, $Z_{z|ijf}(p_R, w_{jf}, M_f, G_{ij}, g_{ij}, G_i, g_i)$, while $p_{ijk|f}(p_R, R, w, M_f, G, g)$ are the consumers' probabilities for the discrete choice of zone of residence, workplace and housing type. $q_{ik}(R_{ik})$ are the landlords' occupancy probabilities $Q_{i0k}(V_{i0}, V_{i1}, \ldots V_{i\aleph})$, while $Q_{ik0}(V_{i0}, V_{ik})$ are the developers' discrete choice probabilities of construction and demolition.

Section 3a. Non-Wage Income

The per-consumer non-wage incomes $M_f$ are specified by the following equation:

$$M_f(V, S) = \xi_f \frac{\Lambda + \Theta}{N_f} > 0 \quad (24)$$

where $$\Lambda = \sum_{\forall k}\sum_{\forall j} \frac{\rho}{1+\rho} V_{jk} S_{jk}$$

is the aggregate discounted annual return from real estate in the region and $\Theta$, if positive, is aggregate asset income from all other sources inside and outside the region that is owned by consumers in the region. If $\Theta$ is negative it would mean that, on the net, consumers in the region own assets that add up to less than the total after-tax return of their region's real estate assets. The coefficients $\xi_f$, wherein $$\sum_{f=1}^{F} \xi_f = 1,$$

are the aggregate share of skill group f in the aggregate regional non-wage income and thus serve to distribute this aggregate among the various skill groups. The aggregate non-wage income composition equation is then $$\sum_{\forall f} N_f M_f = \Lambda + \Theta.$$

Thus, equation (24) links non-wage incomes to local real estate values since these are likely major sources of non-wage income, but treats other in- or outflows of non-wage income, i.e., Θ, as an exogenous constant.

Section 3b. Real Estate Rental Markets

For the k=1 ... $\aleph_1$ housing types and the k=1 ... $\aleph_2$ commercial building types, the demand for floor space must equal its supply in each zone $\Im$. There are $\Im\aleph_1 + \Im\aleph_2$ such equations:

$$\sum_{\forall f} N_f \sum_{\forall j} P_{ijk|f}(p_R, R, w, M_f, G, g) b_{ijk|f}(R_{ik}, w_{jf}, M_f, G_{ij}, g_{ij}) = \quad (25)$$

$$S_{ik}q_{ik}(R_{ik})$$

$$\sum_{\forall r} B_{k|ri}(p_{ri}, X_{ri}, R_i) = S_{ik}q_{ik}(R_{ik}) \quad (26)$$

where equation (25) represents residential floor space and equation (26) represents business floor space.

Section 3c. Labor Markets

In each of the j=1 ... $\Im$ model zones, the annual demand for the labor hours of each of the f=1 ... F skill groups must equal the labor hours supplied by those skill groups. Consequently, there are F$\Im$ such equations:

$$\sum_{r=1}^{\Re+2\aleph} L_{f|rj}(p_{rj}, X_{rj}, w_j) = \quad (27)$$

$$N_f \sum_{\forall i,k=1}^{\aleph_1} \left[ H - dG_{ij} - c_{ij} \sum_{\forall z} G_{iz} Z_{z|ijf}(p_R, w_{jf}, M_f, G_{ij}, g_{ij}, G_i, g_i) \right]$$

$$P_{ijk|f}(p_R, R, w, M_f, G, g)$$

Section 3d. Product Markets

For each basic industry, the aggregate output of that industry in a model zone j can be either directly exported from that zone or shipped to be used as an intermediate input to any other basic industry including the same industry, or to any construction/demolition industry in any model zone. Letting $\Xi_{ri}$ be the exogenous export demands, this implies the following $\Im(\Re-1)$ equations that clear the basic product markets:

$$\sum_{n=1...\Re+2\aleph} \sum_{s=1...\Im} Y_{ri|ns}(X_{ns}, p_{ns}, p_r, ;g) + \Xi_{ri} = X_{ri} \quad (28)$$

In the case of the retail industry, the method of the instant invention assumes that some output can be exported directly from the zone where the retail occurs with the rest being purchased by consumers who shop at that zone. There are $\Im$ such equations, one for each model zone:

$$\sum_{\forall f} N_f \sum_{\forall (n,s,k)} P_{nsk|f}(p_R, R, w, M_f, G, g) \quad (29)$$

$$Z_{i|nsf}(p_R, w_{sf}, M_f, G_{ij}, g_{ij}, G_n, g_n) + \Xi_{Ri} = X_{Ri}$$

Unlike the basic industries, the outputs of the construction and demolition industries are measured directly as the specific type of floor space constructed and demolished. Thus, $$X\Re_{+s,i} = m_s S_{i0} Q_{i0s}(V_{i0}, V_{i1}, \ldots, V_i\aleph) \text{ and } X\Re_{+\aleph+s,j} = S_{is} Q_{is0}(V_{is}, V_{i0}) \quad (30)$$

are the floor-space output of each s=1, ..., $\aleph$ construction industry in zone i and the floor-space output of each s=1, ..., $\aleph$ demolition industry in zone i, respectively.

Section 3e. Normal Returns

As discussed in Section 2 above, all firms in the model make zero economic profit. This also means that global investors who lend financial capital to these firms make only a normal return equal to the interest rate ρ. The zero profit equation (18) has the following shorthand form and there are $\Im(\Re+2\aleph)$ such equations:

$$p_{ri} - p_{ri}(p, w_i, R_i, g) = 0 \quad (31)$$

In real estate asset markets, there are $\aleph+1$ potential assets representing vacant land and the $\aleph$ building types potentially present in every zone. Investors in these assets make zero after-tax expected profits according to the equations derived in Section 2 above. There are $\Im$ such equations (23a) for vacant land assets, i.e., one for each model zone and each is of the form:

$$V_{i0} - V_{i0}(V_{i0}, V_{ik}; k=1 \ldots \aleph) = 0 \quad (32a)$$

There are also, $\Im\aleph$ such equations for each building type, i.e., equation (23c), situated in each model zone:

$$V_{ik} - V_{ik}(R_{ik}, V_{i0}, V_{ik}) = 0 \quad (32b)$$

Section 3f. Building Stock Conversions

In stationary equilibrium, for each type of building, the flow of demolished floor space equals that constructed so that the stock of each building type in each model zone remains stable in each year. See Alex Anas and Richard J. Arnott, *Taxes and Allowances in a Dynamic Equilibrium Model of Urban Housing Market with a Size-Quality Hierarchy*, 27 Regional Science and Urban Economics 547, 547-580 (1997). There are, therefore, $\Im\aleph$ such equations:

$$S_{ik}Q_{ik0}(V_{i0}, V_{ik}) = m_k S_{i0} Q_{i0k}(V_{i0}, V_{i1}, \ldots, V_i\aleph) \quad (33a)$$

Meanwhile, in each model zone, the total amount of land, $J_i$, is given. Hence the acres taken up by each real asset type including land that remains vacant, must add up to $J_i$. This requires $\Im$ more equations, one for each model zone.

$$\sum_{k=0,\ldots,\aleph} \frac{1}{m_k} S_{ik} = J_i \cdot (m_0 \equiv 1) \quad (33b)$$

Together with the $\aleph$ flow equations above, this last equation implies that, in a stationary state, the land taken up by construction in a model zone must be replenished by the land created by demolition in the same model zone. Only stationary dynamics are considered here. One of ordinary skill in the art will recognize the relationship between the stationary state and the non-stationary dynamics. See Alex Anas and Richard J. Arnott, *Taxes and Allowances in a Dynamic Equilibrium Model of Urban Housing Market with a Size-Quality Hierarchy*, 27 Regional Science and Urban Economics 547, 547-580 (1997).

Section 3g. Summary

Given G and g, the structure of expected inter-zonal transport travel times and monetary costs, the above completes the description of the general equilibrium system of RELU, i.e., the regional economy and land use model. The general equilibrium is comprised of a total of $\Im(7\aleph+2\Re+F+2)$ equations and the same number of unknowns. These unknowns are: rents for each type of floor space in each model zone, R; wages for each skill type of labor in each model zone, w; prices of output for the basic and con-dem industries in each model zone, p; outputs of the basic and con-dem industries in each model zone, X; the stationary asset prices of each type of floor space and vacant land in each model zone, V; and, the stationary stocks of each type of floor space and vacant land in each model zone, S. Table 1 below summarizes the count of equations and unknowns in the RELU general equilibrium referring to the equation numbers in the text. In the bottom of the table, the TRAN equations, described in the next section, are also included.

TABLE 1

Equations and unknowns in the RELU-TRAN general equilibrium

| | Equation numbers in text | Endogenous Variables | Count of equations and unknowns |
|---|---|---|---|
| Floor space markets | | Rents, R | |
| Residential | (25) | $R_1,...R_{\aleph_1}$ | $\Im \aleph_1 = 28$ |
| Commercial | (26) | $R_{\aleph_1+1},...R_{\aleph}$ | $\Im \aleph_2 = 28$ |
| Labor markets | | Wages, w | |
| By skill level | (27) | $w_1,...,w_F$ | $\Im F = 56$ |
| Industry outputs | | Outputs, X | |
| Non-retail basic | (28) | $X_1,...X_{\Re-1}$ | $\Im(\Re-1) = 42$ |
| Retail basic | (29) | $X_{\Re}$ | $\Im = 14$ |
| Construction-demolition | (30) | $X_{\Re+1},...,\aleph_1+\aleph_2$ | $2\Im(\aleph_1+\aleph_2) = 112$ |
| Normal returns (production) | (18) | Product prices, p | |
| Basic industries | | $p_{1,...,\Re}$ | |
| Con-dem industries | | $p_{\Re+1,...,\aleph_1+\aleph_2}$ | $\Im \aleph = 56$ |
| | | | $2\Im(\aleph_1+\aleph_2) = 112$ |
| Normal returns (development) | (23a), | Asset prices, | |
| Buildings (resid., comm.) | (23c) | V $V_1,...V_{\aleph_1+\aleph_2}$ | $\Im(\aleph_1+\aleph_2) = 56$ |
| Land | | $V_0$ | $\Im = 14$ |
| Stocks of real estate | | Floor spaces, S | |
| Buildings | (33a), | $S_1,...S_{\aleph_1+\aleph_2}$ | $\Im(\aleph_1+\aleph_2) = 56$ |
| Land | (33b) | $S_0$ | $\Im = 14$ |
| Highway network equilibrium | (42) | FLOW | L = 68 |
| | FLOW | R, w, X, p, V, S, F + 2) + L | $\Im(7\aleph_1 + 7\aleph_2 + 2\Re + F + 2) + L$ |
| Total equations and unknowns: | | | |
| $\Im = 14, \Re = 4, \aleph_1 = 2, \aleph_2 = 2,$ F = 4, L = 68 | | | 656 |

Section 4. TRAN: Highway User Equilibrium

It should be noted that to avoid duplicating RELU notation, some TRAN variables and parameters are defined in capital letter "words". An output of the general equilibrium of RELU is the origin to destination matrix of all two-way daily person trips from any origin zone i to any destination zone j and back to origin zone i, including commuting trips from residences in zone i to workplaces in zone j, plus discretionary trips from residences in zone i to retail destinations in zone j>0. These are found by summing over RELU functions evaluated at their equilibrium values:

$$RELUTRIPS_{ij} = \left(\sum_{\forall f} N_f \sum_{k=1}^{\aleph_1} P_{ijk|f}\right) + \quad (34)$$

$$\left(\frac{1}{d}\right)\left(\sum_{\forall f} N_f \sum_{s=0}^{\mathcal{J}'} \sum_{k=1}^{\aleph_1} P_{isk|f} c_{isf} Z_{j|isf}\right); j > 0, i = 1...\mathcal{J}'$$

where $P_{ijk|f} = P_{ijk|f}(p_R, R, w, M_f, G, g)$ and $Z_{j|isf} = Z_{j|isf}(p_R, w_{sf}, M_f, G_{is}, g_{is}, G_i, g_i)$.

The role of the transportation model, TRAN, begins with RELUTRIPS which stands for the conventional origin to destination trip matrix of travel forecasting. Taking these from RELU, TRAN performs several transportation tasks. First, the trips are split by mode of travel into auto, transit and other modes. Second, the trips choosing the auto mode are assigned to the road-link highway network (see FIG. 1) by performing a stochastic user equilibrium that determines congested travel times for each link on the network. In the instant invention, congestion in the non-auto modes is not modeled and time of day variations in travel are ignored, however one of ordinary skill in the art will appreciate that such factors may also be incorporated within the method of the instant invention.

$\pi_{m|ij}$ are the probabilities that a consumer taking a trip originating in zone i and terminating in zone j will choose mode m. These mode choice probabilities come from the following mode choice model where $MODE_{ij}$ is the set of modes, which is a subset of auto (m=1), transit (m=2) and other (m=3), available to trips originating from zone i and going to zone j:

$$\pi_{m|ij} = \frac{\delta_{m|ij} \exp^{\lambda}(C_{m|ij} + \hbar_{m|ij})}{\sum_{n=1}^{3} \delta_{n|ij} \exp^{\lambda}(C_{n|ij} + \hbar_{n|ij})}, \sum_{m=1}^{3} \pi_{m|ij} = 1 \quad (35)$$

where $\delta_{m|ij}=1$ if $m \in MODE_{ij}$ and $\delta_{m|ij}=0$ if $m \notin MODE_{ij}$. Additionally, $\delta_{m|ij}=1$ for at least one mode m. $C_{m|ij}=\tilde{c}_{m|ij}+\tilde{c}_{m|ji}$ for $m \in MODE_{ij}$ are the expected round trip generalized costs of travel per person by mode m from zone i to zone j. $\lambda > 0$ is the mode choice cost dispersion coefficient and $\hbar_{m|ij}$ are the mode-specific constants. The one-way per person generalized costs $\tilde{c}_{m|ij}$ are defined as follows for each of the modes:

$$\tilde{c}_{1|ij} = -\frac{1}{LAMDA} \ln \sum_{s \in ROUTES_{ij}} \exp\left(\begin{array}{c}-LAMDA \times \\ RGCOST_{s \in ROUTES_{ij}}\end{array}\right) \quad (36a)$$

$$\tilde{c}_{2|ij} = (VOT)t_{ij2} + v_{ij2}, \text{ if } \delta_{2|ij} = 1, \quad (36b)$$

$$\tilde{c}_{3|ij} = (VOT)t_{ij3} + v_{ij3}, \text{ if } \delta_{3|ij} = 1. \quad (36c)$$

Equation (36a), for the auto mode, is the expected minimized generalized cost of travel over all routes in the set of routes, i.e., $ROUTES_{ij}$, connecting the origin zone i and the destination zone j. The equation comes from the route-choice model which is discussed below. LAMDA>0 is the route choice model's cost-dispersion coefficient. RGCOST, the generalized cost of travel by auto, is obtained from the route choice model. In equation (36b), for transit, and equation (36c), for the "other" mode, VOT is the value of time for travel on the network, and is assumed uniform across all travelers. $t_{ijm}$, $m \geq 2$, is the travel time from zone i to zone j for a non-auto mode, and $v_{ijm}$, $m \geq 2$, is the non-auto traveler's monetary cost for travel from zone i to zone j. Since congestion in non-auto modes is not modeled, these non-auto travel times and monetary costs are treated as constants.

Now, turning to the auto mode, given that ñ is a constant car occupancy rate in persons per vehicle, then the one-way vehicle trips originating at zone $i=1 \ldots \Im'$ and terminating at zone $j>0$ that must be allocated to the highway network are:

$$TRIPS_{ij} = [RELUTRIPS_{ij} \times \pi_{1|ji} + RELUTRIPS_{ji} \times \pi_{1|ji}]\left(\frac{1}{\tilde{\eta}}\right) \quad (37)$$

These one-way auto vehicle trips for each origin-destination zone pair are assigned to a highway network with a link-node representation (see FIG. 1). The nodes correspond exactly to RELU zone centroids and the links are crude aggregations of the underlying road system. A congested highway network equilibrium is then calculated based on a stochastic cost minimization model of network equilibrium and solved according to a fixed point formulation. See Carlos F. Daganzo and Yoseff Sheffi, *On Stochastic Models of Traffic Assignment*, 11 Transportation Science 253, 253-274 (1977); Alex Anas and Ikki Kim, *Network Loading versus Equilibrium Estimation of the Stochastic Route Choice Model Maximum Likelihood versus Least Squares Revisited*, Journal of Regional Science, 30, 1, 89-103 (1990).

For the route choice model, the following notation is defined. $i=1 \ldots \Im'$ are zone centroids of trip origins, i.e., residential locations, and $j=1 \ldots \Im$ are zone centroids of trip destinations, i.e., work or retail locations. $l=1 \ldots L$ are the links on the aggregated highway network. $ROUTES_{ij}$ are the set of permissible highway routes, each route being itself a set of sequential links on the highway network, connecting origin i with destination j. $r \in ROUTES_{ij}$ is such a highway route that belongs to the above set. $a_{l \in r \in ROUTE_{ij}}$ is zero or one depending on link 1 belonging, or not, to route $r \in ROUTES_{ij}$. $PROB_{r \in ROUTES_{ij}}$ is the probability that an auto vehicle trip originating at node i and terminating at node j will choose route $r \in ROUTES_{ij}$. This probability is given by the following multinomial logit, assuming that the travelers choose the route that minimizes their perceived generalized cost of travel:

$$PROB_{r \in ROUTES_{ij}} = \frac{\exp(-LAMDA \times RGCOST_{r \in ROUTES_{ij}})}{\sum_{\forall s \in ROUTES_{ij}} \exp(-LAMDA \times RGCOST_{s \in ROUTES_{ij}})} \quad (38)$$

See, e.g., Carlos F. Daganzo and Yoseff Sheffi, *On Stochastic Models of Traffic Assignment*, 11 Transportation Science 253, 253-274 (1977). As noted earlier, LAMDA>0 is the route cost dispersion coefficient and $RGCOST_{r \in ROUTES_{ij}}$ is the route's generalized cost of travel per vehicle calculated from:

$$RGCOST_{r \in ROUTES_{ij}} = \sum_{\forall \ell} a_{\ell \in r \in ROUTES_{ij}} \times [VOT \times TIME_\ell + MCOST_\ell] \quad (39)$$

The earlier equation (36a) gives the expected minimized cost over the set $ROUTES_{ij}$. $TIME_l$, the congested one-way travel time, in minutes, on link l is calculated from the following congestion function:

$$TIME_\ell = ALPHA_\ell \times LENGTH_\ell\left(1 + BETA_\ell\left[\frac{FLOW_\ell}{CAP_\ell}\right]^{CEXP}\right) \quad (40)$$

where $LENGTH_l$ is the length of the highway link in miles, $APLHA_l$ is the inverse vehicle free-flow, i.e., uncongested, speed on link l in minutes per mile, $BETA_l$ and CEXP are coefficients and $CAP_l$ is the capacity of link l. $FLOW_l$ is the vehicle traffic-flow on a highway link to be determined endogenously in the highway network equilibrium. $MCOST_l$ is the one-way per traveler monetary cost on a link and is assumed not to depend on congestion. It is calculated from:

$$MCOST_\ell = UCOST_\ell \times LENGTH_\ell \times \left(\frac{1}{\tilde{\eta}}\right) \quad (41)$$

where $UCOST_l$ is the exogenous unit monetary cost in dollars per vehicle mile. The generalized cost of travel on a particular route on the network, RGCOST, and the expected minimized cost are then calculated by substituting equations (40) and (41) within equation (39) and then equation (39) within equation (36a).

In TRAN, the congested equilibrium network flows on each highway link are calculated from simultaneous equations at the link level:

$$FLOW_\ell = \sum_{\forall ij} TRIPS_{ij} \sum_{r \in ROUTES_{ij}} PROB_{r \in ROUTES_{ij}} \times a_{\ell \in r \in ROUTES_{ij}}, \forall \ell \quad (42)$$

after substituting equations (40) and (41) within equation (39), the resulting equation (39) within equation (38) and the resulting equation (38) within equation (42). See Alex Anas and Ikki Kim, *Network Loading versus Equilibrium Estimation of the Stochastic Route Choice Model Maximum Likelihood versus Least Squares Revisited*, Journal of Regional Science, 30, 1, 89-103 (1990). Then, given $TRIPS_{ij}$ pre-calculated from equation (37), the resulting L equations in equation (42) are solved simultaneously for the uniquely determined fixed point equilibrium $FLOW_l$, l=1, . . . , L.

What remains is to use the output of TRAN to calculate the travel times and costs, $G=[G_{ij}]$ and $g=[g_{ij}]$, respectively, used by consumers to make choices in RELU:

$$G_{ij} = \sum_{m=1}^{3} \pi_{m|ij}(t_{m|ij} + t_{m|ji}) \quad (43)$$

$$g_{ij} = \sum_{m=1}^{3} \pi_{m|ij}(v_{m|ij} + v_{m|ji}) \quad (44)$$

where $t_{ijm}, v_{ijm}$ for $m \geq 2$ are the zone-to-zone times and costs for the non-auto modes. For the auto mode, these times and costs are made consistent with the congested highway equilibrium by:

$$t_{ij1} = \sum_{r \in ROUTES_{ij}} PROB_{r \in ROUTES_{ij}} \left( \sum_{\forall \ell} a_{\ell \in r \in ROUTES_{ij}} TIME_\ell \right) \quad (45)$$

and, $$v_{ij1} = \sum_{r \in ROUTES_{ij}} PROB_{r \in ROUTES_{ij}} \left( \sum_{\forall \ell} a_{\ell \in r \in ROUTES_{ij}} MCOST_\ell \right) \quad (46)$$

Section 5. Calibration

It should be noted that in the following section, a calibrated value is denoted with a '^', while a data value has no '^'. Calibration values are solved for use as coefficients for the above described equations, or in other words, used as equation coefficients for the instant invention RELU-TRAN method. The following calibration procedure contains several loops and nested loops and is best understood in view of FIG. 5 which shows a flowchart of the calibration procedure. The following written description uses indentations of varying distances to represent which steps are performed within the various iterative loops:

LOOP 0: CONVERGES ON NON-NEGATIVE RETAIL EXPORTS

STEP 0: Set after-tax wages
$\tilde{w}_{jf}$=after-tax wage received by consumer
$\tilde{w}_{jf}=(1-\theta_f)w_{jf}$, after tax wage STEP 1: Non-wage incomes
The per capita incomes, $I_f$, corresponding to income, i.e., skill quartile f, are constructed from data. Then, the following equation is solved for the per capita before-tax non-wage income $M_f$ of that income quartile. Note that this is a before-tax calculation so before-tax wages are used:

$$\hat{M}_f = \frac{I_f - \sum_{ijk} \hat{P}_{ijk|f}\left[w_{jf}\left(H - dG_{ij}^w - dG_{ji}^w - \left(\sum_z T_{z|if}(G_{ij}^w - G_{ji}^w)\right)\right)\right]}{2}$$

STEP 2: Labor supplies by skill level and place of employment
The labor supplied to employment zone j by all workers of quartile f is calculated as follows:

$$\hat{H}_{jf} = \sum_{ik} N_f \hat{P}_{ijk|f}\left[H - d(G_{ij}^w + G_{ji}^w) - \sum_z T_{z|if}(G_{iz}^{nw} - G_{zi}^{nw})\right]$$

STEP 3: Full incomes, residential floor space demands & full choice probabilities for workers $$\hat{\Psi}_{ijf} = \tilde{w}_{jf}(H - dG_{ij}^w - dG_{ji}^w) + (1 - \vartheta_f)\hat{M}_f - dg_{ij}^w - dg_{ji}^w$$

$$\hat{b}_{ijk|f} = \beta_f \frac{\hat{\Psi}_{ijf}}{R_{ik}}$$

$$\hat{P}_{ijk|f} = \frac{Nemp(f)}{Nemp(j) + Nuemp(f)} \tilde{P}_{ijk|f}$$

STEP 4: Residential floor space demands & full choice probabilities for non-workers. Set full incomes for non-workers $$\hat{\Psi}_{if}^u = (1 - \vartheta_f^u)\hat{M}_f$$

$$\hat{b}_{ik|f}^u = \beta_f \frac{\hat{\Psi}_{if}^u}{R_{ik}}$$

$$\hat{P}_{ik|f}^u = \frac{Nunemp(f)}{Nemp(j) + Nunemp(f)} \tilde{P}_{ik|f}$$

STEP 5: Aggregate residential floor space demands and structural densities
For k=1,2:

$$\hat{S}_{ik} = (1/q_{ik}) \sum_f N_f \left[\sum_j \hat{P}_{ijk|f}\hat{b}_{ijk|f} + \hat{P}_{ik|f}^u \hat{b}_{ik|f}^u\right]$$

$$\hat{m}_{ik0} = \frac{\hat{S}_{ki}}{43560 J_{ki}} \text{(unit ft}^2 \text{ of floor space per ft}^2 \text{ of land)}$$

STEP 6: Aggregate labor demands by distributing labor supplies by skill among the industries in each zone and initialization of aggregate building demands $$\hat{L}_{f|jr} = \hat{H}_{jf}\left(\frac{\text{Employment}(r, j)}{\sum_s \text{Employment}(s, j)}\right)$$

$$\hat{L}_{1|j1} + \hat{L}_{1|j2} + \hat{L}_{1|j3} + \hat{L}_{1|j4} = \hat{H}_{j1}$$

$$\hat{L}_{2|j1} + \hat{L}_{2|j2} + \hat{L}_{2|j3} + \hat{L}_{2|j4} = \hat{H}_{j2}$$

$$\hat{L}_{3|j1} + \hat{L}_{3|j2} + \hat{L}_{3|j3} + \hat{L}_{3|j4} = \hat{H}_{j3}$$

-continued $$\hat{L}_{4|j1} + \hat{L}_{4|j2} + \hat{L}_{4|j3} + \hat{L}_{4|j4} = \hat{H}_{j4}$$

Agriculture:

$$\hat{B}_{0|1j} = 43560\, Jland\,(0,\, j)$$

$$\hat{\beta}_{3|1j} = \frac{0.3\hat{H}_{1j}}{2000} 3500$$

$$\hat{\beta}_{4|1j} = \frac{0.7\hat{H}_{1j}}{2000} 6000$$

Manufacturing:

$$\hat{\beta}_{0|2j} = 0$$

$$\hat{\beta}_{3|2j} = \frac{0.8\hat{H}_{2j}}{2000} 3500$$

$$\hat{\beta}_{4|2j} = \frac{0.2\hat{H}_{2j}}{2000} 6000$$

Non-retail services:

$$\hat{\beta}_{0|3j} = 0$$

$$\hat{\beta}_{3|3j} = \frac{0.9\hat{H}_{3j}}{2000} 3500$$

$$\hat{\beta}_{4|3j} = \frac{0.1\hat{H}_{3j}}{2000} 6000$$

Retail Services:

$$\hat{\beta}_{0|4j} = 0$$

$$\hat{\beta}_{3|4j} = \frac{0.8\hat{H}_{4j}}{2000} 3500$$

$$\hat{\beta}_{4|4j} = \frac{0.2\hat{H}_{4j}}{2000} 6000$$

STEP 7: Initialize floor space stocks and structural densities $$agrent(i) = Rent\,(0,\, i)$$

$$\hat{S}_{j0} = Jland\,(5,\, i) \times 43560,\, k > 0$$

$$\hat{S}_{kj} = Jland\,(k,\, j)\hat{m}_{ik0} \times 43560,\, k > 0$$

$$\hat{m}_{i0k} = \frac{1}{\hat{m}_{ik0}}$$

LOOP 1: CONVERGE STRUCTURAL DENSITIES
STEP 8: Construction & demolition probabilities $$\hat{Q}_{ik0} = \max\left(\min\left(\frac{constr\,(k,\, i)}{\hat{S}_{ki}},\, 0.99\right),\, 0.01\right)$$

If $\hat{Q}_{ik0} = 0.99$, then $constr\,(k,\, i) = 0.99\hat{S}_{ki}$

If $\hat{Q}_{ik0} = 0.01$, then $constr\,(k,\, i) = 0.01\hat{S}_{ki}$ $$\hat{Q}_{i0k} = \frac{\hat{S}_{ki}\hat{Q}_{ik0}}{\hat{S}_{0i}\hat{m}_{ik0}},\, \hat{Q}_{ikk} = 1 - \hat{Q}_{ik0},\, \hat{Q}_{i00} = 1 - \sum_{k>0}\hat{Q}_{i0k}$$

If $\hat{Q}_{i00} < 0$, then $\hat{Q}_{i0k} = \frac{\hat{Q}_{i0k}}{(1.001 - \hat{Q}_{i00})}$ $$co\hat{n}str(k,\, i) = constr\,(k,\, i)\frac{1}{1.001 - \hat{Q}_{i00}}$$

$$\hat{Q}_{i00} = 1 - \sum_{k>0}\hat{Q}_{i0k}$$

STEP 9: Unit prices and real and nominal outputs for construction & demolition $$\hat{p}_{(R+k)j} = 0.7\hat{V}_{kj},\, \hat{p}_{(R+K+k)j} = 0.15\hat{V}_{kj}$$

$$Nomoutput(R + k,\, i) = \frac{1}{clength}co\hat{n}str\,(k,\, i)\hat{p}_{(R+K)i}$$

$$Nomoutput(R + K + k,\, i) = \frac{1}{clength}co\hat{n}str\,(k,\, i)\hat{p}_{(R+K+k)j}$$

STEP 10: Labor demands of the construction & demolition industries and adjust the labor demands of the other industries For r=R+1 ... R+2K:

$$L_{f|rj} = \delta_r\left(\frac{H_{jf}}{H_{j1}}\right)\left(\frac{Nomout(r,\, j)}{\sum_f w_{jf}L_{f|rj}}\right)$$

For r=1 ... R:

$$LDemand(f,\, r,\, j) = L_{f|rj}\left(\frac{H_{jf} - \sum_{R+1}^{R+2K}L_{f|rj}}{H_{jf}}\right)$$

STEP 11: Set nominal outputs of primary industries & update structural densities For r=1 ... R $$NomoutL(r,\, j) = \left(\frac{1}{\delta_r}\right)\sum_{f=1}^{F} w_{jf}LDemand(f,\, r,\, j)$$

$$NomoutB(r,\, j) = \left(\frac{1}{\mu_r}\right)\left(agrent(j)\hat{B}_{0|kj} + \sum_{k=3}^{4} R_{jk}\hat{B}_{k|rj}\right)$$

Scale $\hat{B}_{k|jr}$ for k=3,4 by multiplying with $$\frac{NomoutL(r,\, j)}{NomoutB(r,\, j)}$$

If $\hat{B}_{0|jr} > 0$, then scale agrent(r,j) by multiplying it with $$\frac{NomoutL(r, j)}{NomoutB(r, j)}$$

Nomoutput(r,j)=max (NomoutL(r,j),NomoutB(r,j))
For k=3,4:

$$\hat{m}_{jk0} = \frac{\sum_{r=1}^{4} \hat{B}_{k|rj}}{Jland(k, j)\hat{q}_{jk} \times 43560}$$

$$\text{Calculate Ratio} = \frac{NomoutL(r, j) - NomoutB(r, j)}{NomoutL(r, j) + NomoutB(r, j)}$$

and if it is not too close to zero continue loop 1.
END OF LOOP 1
STEP 12: Leading terms of price equations
Calculate:

$$\rho^{\nu_r}\delta_r^{-\delta_r}\mu_r^{-\mu_r}\nu_r^{-\nu_r}\left(\prod_s \gamma_{sr}^{-\gamma_{sr}}\right)$$

STEP 13: Labor demand constants (Kappas)
Set $\hat{\kappa}_{1|rj}=1$
Calculate $\kappa_{f|rj}$ for f=2,3,4:

$$\hat{\kappa}_{f|rj} = \left(\frac{\hat{L}_{f|rj}}{\hat{L}_{1|rj}}\right)^{1-\theta_j}\left(\frac{w_{jf}}{w_{j1}}\right)$$

STEP 14: Building demand constants (Chis)
Set $\hat{\chi}_{0|rj}=1$
Calculate $\hat{\chi}_{k|rj}$ for k=3,4:

$$\hat{\chi}_{k|rj} = \left(\frac{\hat{B}_{k|rj}}{\hat{B}_{0|rj}}\right)^{1-\zeta_r}\left(\frac{R_{jk}}{R_{j0}}\right)$$

STEP 15: Retail demands (find trips/quantity and demanded retail goods)
Set real outputs of the primary industries, r=1,2,3,4:
$\hat{\chi}_{rj}$=Nomout(r,j)/$\hat{p}_{rj}$
From the budget constraint of non-workers, solve for $\hat{c}_{if}$:
The budget is:

$$\alpha_f(1-\vartheta_f^u)\hat{M}_f = \frac{1}{\hat{c}_{if}}\sum_z \hat{p}_{4z}T_{z|if}^u + \sum_z T_{z|if}^u(g_{iz}^{nw}+g_{zi}^{nw}),$$

recalling
$T_{z|if}^u = Z_{z|if}^u \hat{c}_{if}^u$
From the budget constraint of workers, solve for $\hat{c}_{ijf}$:

$$\alpha_f[\tilde{w}_{jf}(H-dG_{ij}^w - dG_{ji}^w) + (1-\vartheta_f)M_f - dg_{ij}^w - dg_{ji}^w] =$$

-continued $$\frac{1}{\hat{c}_{ijf}}\sum_z \hat{p}_{4z}T_{z|ijf} + \sum_z T_{z|ijf}[(g_{iz}^{nw}+g_{zi}^{nw}) + \tilde{w}_{jf}(G_{iz}^{nw}+G_{zi}^{nw})],$$

recalling $T_{z|ijf} = Z_{z|ijf}c_{ijf}$

If any $\hat{c}_{ijf}$ or $\hat{c}_{if}$ is zero, then abort calibration. Otherwise, define
$\hat{Z}_{z|if}^u = (T_{z|if}^u)^{-1}\hat{c}_{if}^u$
$\hat{Z}_{z|ijf} = (T_{z|ijf})^{-1}\hat{c}_{ijf}$
From the market clearing conditions for retail, solve for net exports $\hat{\Xi}_{4i}$:

$$\sum_{f=1...4} N_f\left(\sum_{n=1...\vartheta,s=1...\vartheta;k=1,2} \hat{P}_{nsk|f}\hat{Z}_{i|nsk} + \sum_{nk}\hat{P}_{nk|f}^u\hat{Z}_{i|nk}^u\right) + \hat{\Xi}_{4i} = \hat{X}_{4i}$$

Define $nexratio(i) = \dfrac{\hat{\Xi}_{4i}}{\hat{X}_{4i}}$

If this ratio is more negative than a desired tolerance, then scale, i.e., reduce, the trips arriving to retail zones i with negative nexratios by dividing those trips by 1−nexratio(i).
Continue LOOP 0 until all nexratios are larger than a small negative tolerance.
END OF LOOP 0
STEP 16: Delivered prices of intermediate inputs & initial int. input demand constants (Upsilons)
In the program, ipsilon refers to the delivered price $\hat{p}_{sn|j}$:
Set these prices: $\hat{\tilde{p}}_{sn|j} = \hat{p}_{sn} + \sigma_s g_{nj}^w$
Then, initialize all Upsilons, $\upsilon_{sn|rj}=1$.
LOOP 2: CONVERGES ON UPSILONS
STEP 17: Intermediate goods demands and net exports of non-retail industries
For industries r=1,2,3 calculate the intermediate input demands using the just initialized Upsilons:

$$\hat{Y}_{sn|rj} = \frac{\upsilon_{sn|rj}^{\frac{1}{1-\varepsilon_r}}\hat{\tilde{p}}_{sn|j}^{\frac{1}{\varepsilon_r-1}}}{\sum_{n=1...\vartheta}\upsilon_{sn|rj}^{\frac{1}{1-\varepsilon_r}}\hat{\tilde{p}}_{sn|j}^{\frac{\varepsilon_r}{\varepsilon_r-1}}}\gamma_{sr}\hat{p}_{rj}\hat{X}_{rj}$$

$$\hat{\Xi}_{ri} = \hat{X}_{ri} - \sum_{ns}\hat{Y}_{ri|ns}$$

Now scale the $\upsilon_{sn|rj}$ by dividing it with $$\left(\frac{\sum_{ns}\hat{Y}_{ri|ns}}{\hat{X}_{ri}}\right)^{1-\varepsilon_n}$$

Continue iterating until the Upsilons are little changed.

END OF LOOP 2

STEP 18: Scale factors for all industries

Solve for $\hat{A}_{rj}$ from the following equation:

$$\hat{A}_{rj} = \hat{p}_{rj}^{-1} \rho^{v_r} \delta_r^{-\delta_r} \mu^{-\mu} v_r^{-v_r} \left( \prod_s \gamma_{sr}^{-\gamma_{sr}} \right) \left( \sum_{f=0,1,2,3,4} \hat{k}_{f|rj}^{\frac{1}{1-\theta_r}} w_{jf}^{\frac{\theta_r}{\theta_r-1}} \right)^{\frac{\varepsilon_r(\theta_r-1)}{\theta_r}} \times$$

$$\left( \sum_{k=0,1,2,3,4,5} \hat{\chi}_{k|rj}^{\frac{1}{1-\zeta_r}} R_{jk}^{\frac{\zeta_r}{\zeta_r-1}} \right)^{\frac{\mu_r(\zeta_r-1)}{\zeta_r}} \times \prod_{s=1...12} \left( \sum_{n=1,...,9} \hat{v}_{sn|rj}^{\frac{1}{1-\varepsilon_r}} \hat{p}_{sn|j}^{\frac{\varepsilon_r}{\varepsilon_r-1}} \right)^{\frac{\gamma_{sr}(\varepsilon_r-1)}{\varepsilon_r}}$$

STEP 19: Total asset income, outside incomes and unearned income shares

Set the aggregate (before-tax) outside income:

$$\hat{\Theta} = \sum_f \hat{M}_f N_f - \left[ \frac{\sum_{rj} v_r \hat{p}_{rj} \hat{X}_{rj}}{1+\rho} + \sum_{jk} \frac{\rho - \tau_{jk}}{1+\rho} \hat{V}_{jk} \hat{S}_{jk} \right]$$

$$\hat{\xi}_f^{-1} = \left\{ \frac{1}{\hat{M}_f N_f} \left[ \left( \frac{1}{1+\rho} \sum_r \sum_j v_r \hat{p}_{rj} \hat{X}_{rj} \right) + \sum_k \sum_j \frac{\rho - \tau_{jk}}{1+\rho} \hat{V}_{jk} \hat{S}_{jk} + \hat{\Theta} \right] \right\}$$

STEP 20: Occupancy dispersion parameters and constants, expected rents

For each i and each building type k>0, set:

$$\hat{\phi}_{ik} = \frac{epsvac(k)}{(1-\hat{q}_{ik})\hat{R}_{ik}}$$

$$\hat{D}_{ikv} = 0$$

$$\hat{D}_{iko} = \hat{R}_{ik} - \left( \frac{1}{\hat{\phi}_{ik}} \right) \log\left( \frac{\hat{q}_{ik}}{1-\hat{q}_{ik}} \right)$$

$$\omega_{ik}(\hat{R}_{ik}) = \frac{1}{\hat{\phi}_{ik}} \log\left[ 1 + e^{\hat{\phi}_{ik}(\hat{R}_{ik} - \hat{D}_{iko})} \right]$$

STEP 21: Dispersion parameters of construction/demolition

For each i:

$$\hat{\Phi}_{io} = (1+\rho) epsconv(0) \frac{\sum_{ik} \hat{S}_{ik}}{\sum_{ik} \hat{R}_{ik} \hat{m}_{ik0} \hat{S}_{io} \hat{Q}_{i0k}(1-\hat{Q}_{i0k})}$$

For each k and i:

$$\hat{\Phi}_{ik} = (1+\rho) epsconv(k) \frac{\sum_i \hat{S}_{ik}}{\sum_i \hat{R}_{io} \hat{m}_{i0k} \hat{S}_{ik} \hat{Q}_{ik0}(1-\hat{Q}_{ik0})}$$

STEP 22: Constants of construction/demolitions

Construction constants:

1. Set $F_{i00}=0$
2. Calculate $$F_{i0k} = \ln\left( \frac{\hat{Q}_{i0k}}{\hat{Q}_{i00}} \right) + \frac{1}{1+\rho} \hat{\Phi}_{i0} \left[ \hat{V}_{ik} - (\hat{V}_{ik} - \hat{p}_{(4+k)i}) \hat{m}_{ik0} \right]$$

for each k.

3. Calculate:

$$\Delta_{i0} = \Phi_{i0} \frac{1+\rho+\tau_{ik}}{1+\rho} \hat{V}_{i0} - \Phi_{i0} \hat{\omega}_{i0}(R_{i0}) -$$

$$\ln\left\{ \exp\left( \frac{1}{1+\rho} \Phi_{i0} \hat{V}_{i0} + F_{i00} \right) + \sum_{z>0} \exp\left[ \frac{1}{1+\rho} \Phi_{i0} (\hat{V}_{iz} - \hat{p}_{(4+z)i}) + F_{i0z} \right] \right\}$$

4. Now set $\hat{F}_{i00} = \Delta_{i0}$ $\hat{F}_{i0k} = F_{i0k} + \Delta_{i0}$ Demolition constants:

1. Set $F_{ikk}=0$
2. Calculate $$F_{ik0} = \ln\left( \frac{\hat{Q}_{ik0}}{\hat{Q}_{ikk}} \right) + \frac{1}{1+\rho} \hat{\Phi}_{ik} \left[ \hat{V}_{ik} - \left( \frac{\hat{V}_{i0}}{\hat{m}_{ik0}} - \hat{p}_{(8+k)i} \right) \right] + F_{ikk}$$

3.

$$\Delta_{ik} =$$

$$\hat{\Phi}_{ik} \left( \frac{1+\rho+\tau_{ik}}{1+\rho} \hat{V}_{ik} + \omega_{ik}(R_{ik}) \right) - \ln\left\{ e^{\frac{\hat{\Phi}_{ik} \hat{V}_{ik}}{1+\rho}} + e^{\frac{\hat{\Phi}_{ik}}{1+\rho} \left( \frac{\hat{V}_{i0}}{\hat{m}_{ik0}} - p_{(8+k)i} \right) + F_{ik0}} \right\}$$

4. Now set $\hat{F}_{ikk} = \Delta_{ik}$ $\hat{F}_{ik0} = F_{ik0} + \Delta_{ik}$ STEP 23: Constants of retail demand functions (iotas)

For each ijf and for z=1 set $\hat{\iota}_{1|ijf}=1$. Then, for each z>1, set:

$$\hat{\iota}_{z|ijf} = \left( \frac{\hat{\psi}_{z|ijf}}{\hat{\psi}_{1|ijf}} \right) \left( \frac{\hat{Z}_{z|ijf}}{\hat{Z}_{1|ijf}} \right)^{1-\eta_f}$$

For each if and for z=1 set $\hat{\iota}_{1|if}=1$. Then, for each z>1, set:

$$\hat{\iota}_{z|if} = \left( \frac{\hat{\psi}_{z|if}}{\hat{\psi}_{1|if}} \right) \left( \frac{\hat{Z}^u_{z|if}}{\hat{Z}^u_{1|if}} \right)^{1-\eta_f}$$

STEP 24: Constant effects of worker/non-worker choice probabilities

Set $\hat{E}_{111|f}=0$. Then, for all other ijk calculate:

$$\hat{E}_{ijk|f} = \frac{1}{\lambda_f}\ln\left(\frac{\hat{P}_{ijk|f}}{\hat{P}_{111|f}}\right) - \ln\left(\frac{\hat{\Psi}_{ijf}}{\hat{\Psi}_{11f}}\right) + \beta_f\left(\frac{R_{ik}}{R_{11}}\right) + \frac{\alpha_f(\eta_f-1)}{\eta_f}\ln\left(\frac{\sum_z \hat{t}_{z|if}^{\frac{1}{1-\eta_f}} \hat{\psi}_{z|if}^{\frac{\eta_f}{\eta_f-1}}}{\sum_z \hat{t}_{z|1if}^{\frac{1}{1-\eta_f}} \hat{\psi}_{z|1if}^{\frac{\eta_f}{\eta_f-1}}}\right)$$

Set $\hat{E}_{11|f}^u=0$. Then, for all other ik calculate:

$$\hat{E}_{ik|f}^u = \frac{1}{\lambda_f}\ln\left(\frac{\hat{P}_{ik|f}}{\hat{P}_{11|f}}\right) + \beta_f\left(\frac{R_{ik}}{R_{11}}\right) + \frac{\alpha_f(\eta_f-1)}{\eta_f}\ln\left(\frac{\sum_z \hat{t}_{z|if}^{\frac{1}{1-\eta_f}} \hat{\psi}_{z|if}^{u\frac{\eta_f}{\eta_f-1}}}{\sum_z \hat{t}_{z|1if}^{\frac{1}{1-\eta_f}} \hat{\psi}_{z|1if}^{\frac{\eta_f}{\eta_f-1}}}\right)$$

STEP 25: Constant effects and dispersions in mode choice

Generalized costs by mode and time of day:

$$\hat{c}_{ijm\tau} = t_{ijm\tau} + \frac{1}{60\bar{w}_{if}} v_{ijm\tau}$$

Generalized costs of trip patterns by modes:
$\hat{C}_{ijm1}^{fl} = \hat{c}_{ijm1}^{fl} + \hat{c}_{jim1}^{fl}$
$\hat{C}_{ijm2}^{fl} = \hat{c}_{ijm1}^{fl} + \hat{c}_{jim2}^{fl}$
$\hat{C}_{ijm3}^{fl} = \hat{c}_{ijm2}^{fl} + \hat{c}_{jim1}^{fl}$
$\hat{C}_{ijm4}^{fl} = \hat{c}_{ijm2}^{fl} + \hat{c}_{jim2}^{fl}$ For each f,l, calculate the trip dispersion parameter in mode choice:

$$\lambda_{ff} = \frac{elasmtpc(f,\ell)}{\sum_{ijmp} \pi_{mp|ijf\ell}(1-\pi_{mp|ijf\ell})\hat{C}_{ijmp}}$$

For each f,l, set $\hbar_{11|fl}=0$, and for each $(m,p)\neq(1,1)$:
For each f,l the remaining eleven $\hbar_{mp|fl}=0$, are found uniquely to satisfy the following equations:

$$\sum_{ij} \pi_{mp|ijf\ell} = \sum_{ij}\frac{\exp(\lambda_{f\ell}C_{ijmp}^{f\ell} + \hbar_{mp|f\ell})}{\sum_{ns}\exp(\lambda_{f\ell}C_{ijns}^{f\ell} + \hbar_{ns|f\ell})}$$

Figure 4:
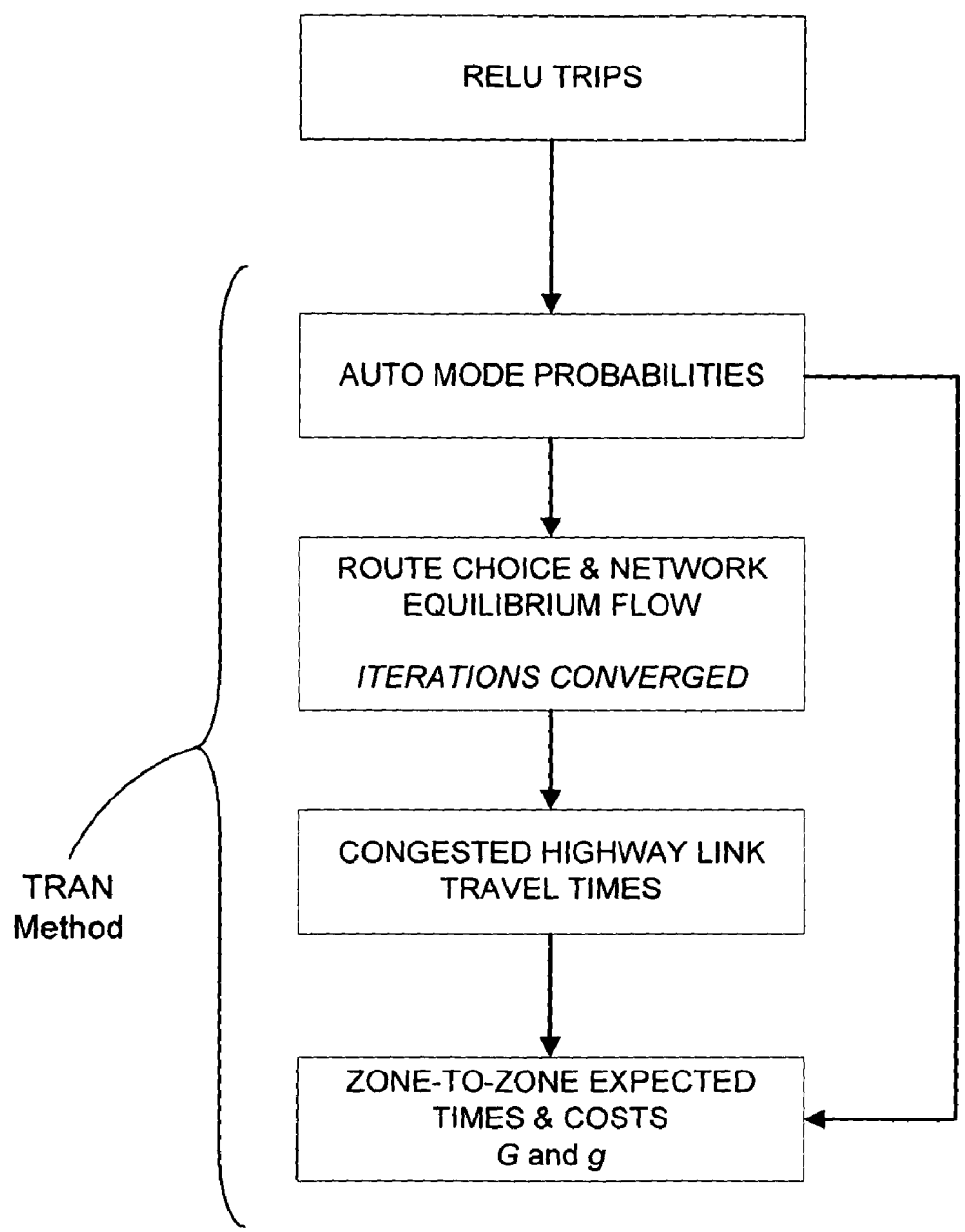
FIG. 4 is a flowchart depicting an embodiment of a present invention method of modeling transportation needs; and, FIG. 5 is a flowchart depicting an embodiment of a calibration procedure for a present invention method of modeling regional economic, land use and transportation needs.
Figure 5:
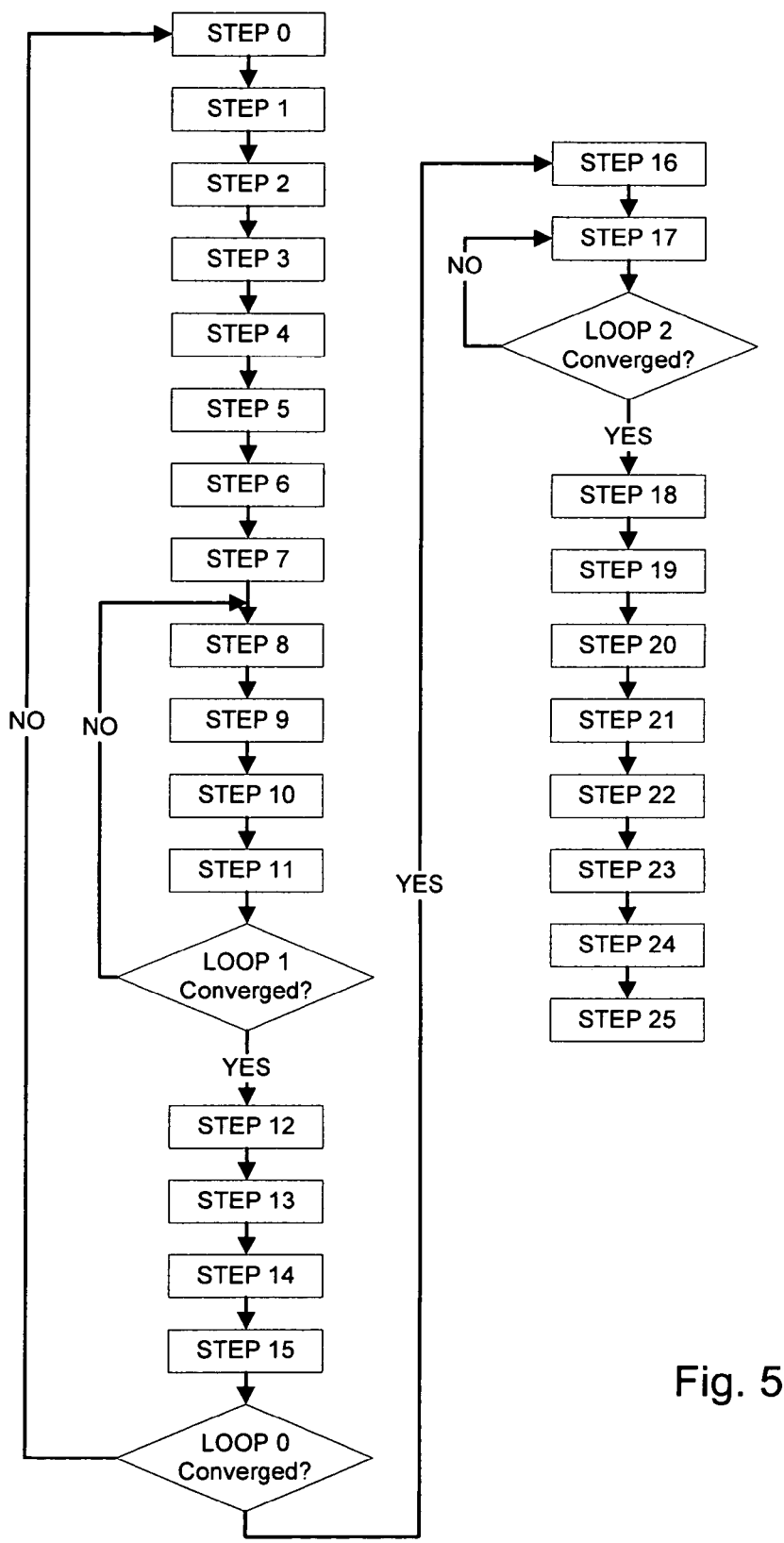

As can be seen in FIG. 5, the calibration procedure includes the above described twenty-five (25) steps, and also includes three (3) iterative loops during which a plurality of coefficients, i.e., calibration values, are calculated for use during further stages of the RELU-TRAN method. After the calibration calculations are completed, the RELU-TRAN method continues according to the more detailed description below, in view of FIGS. 2, 3 and 4.

Section 6. Testing the Unified RELU-TRAN Algorithm

Figure 2:
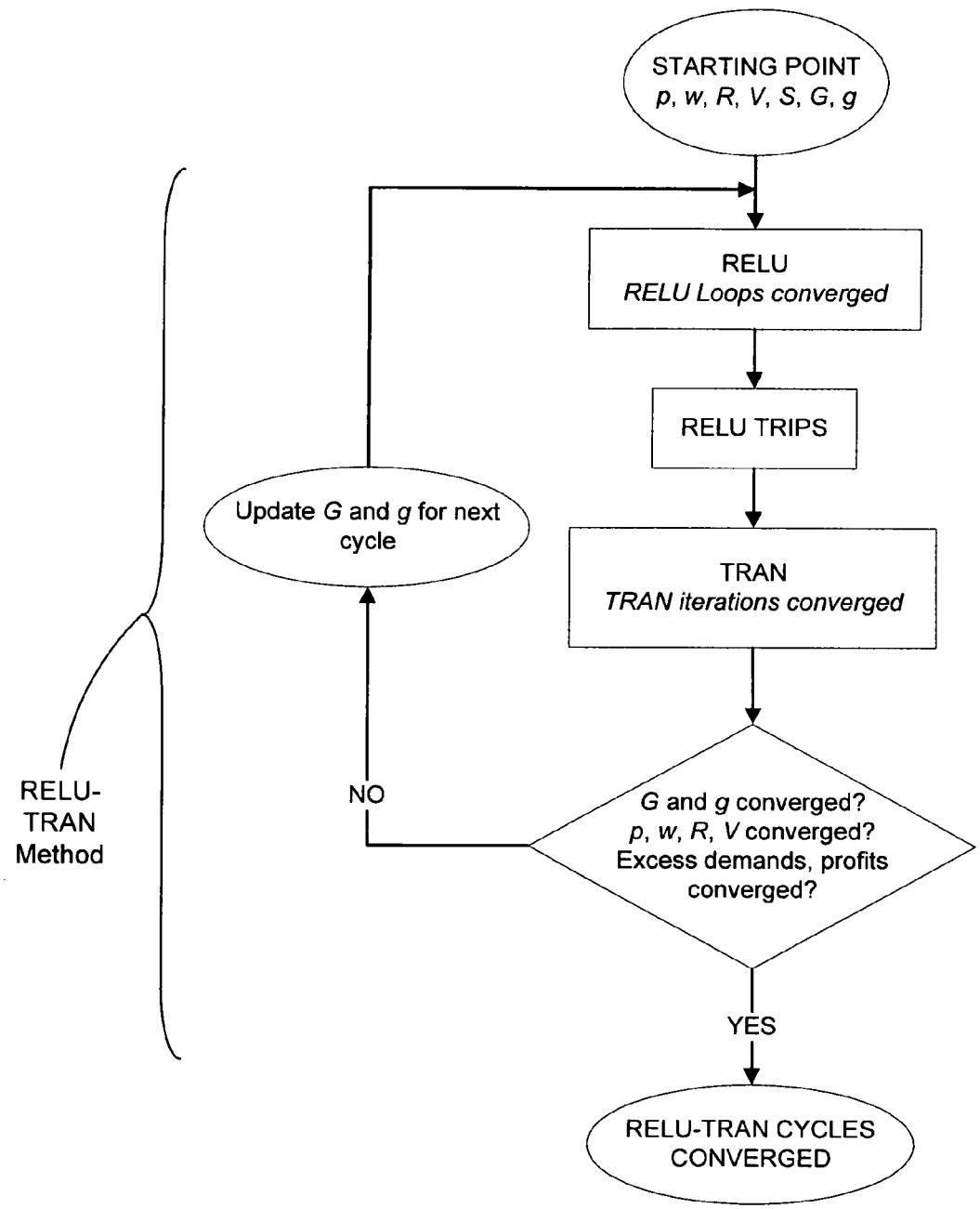
FIG. 2 is a flowchart depicting an embodiment of a present invention method of modeling regional economic, land use and transportation needs.
Figure 3:
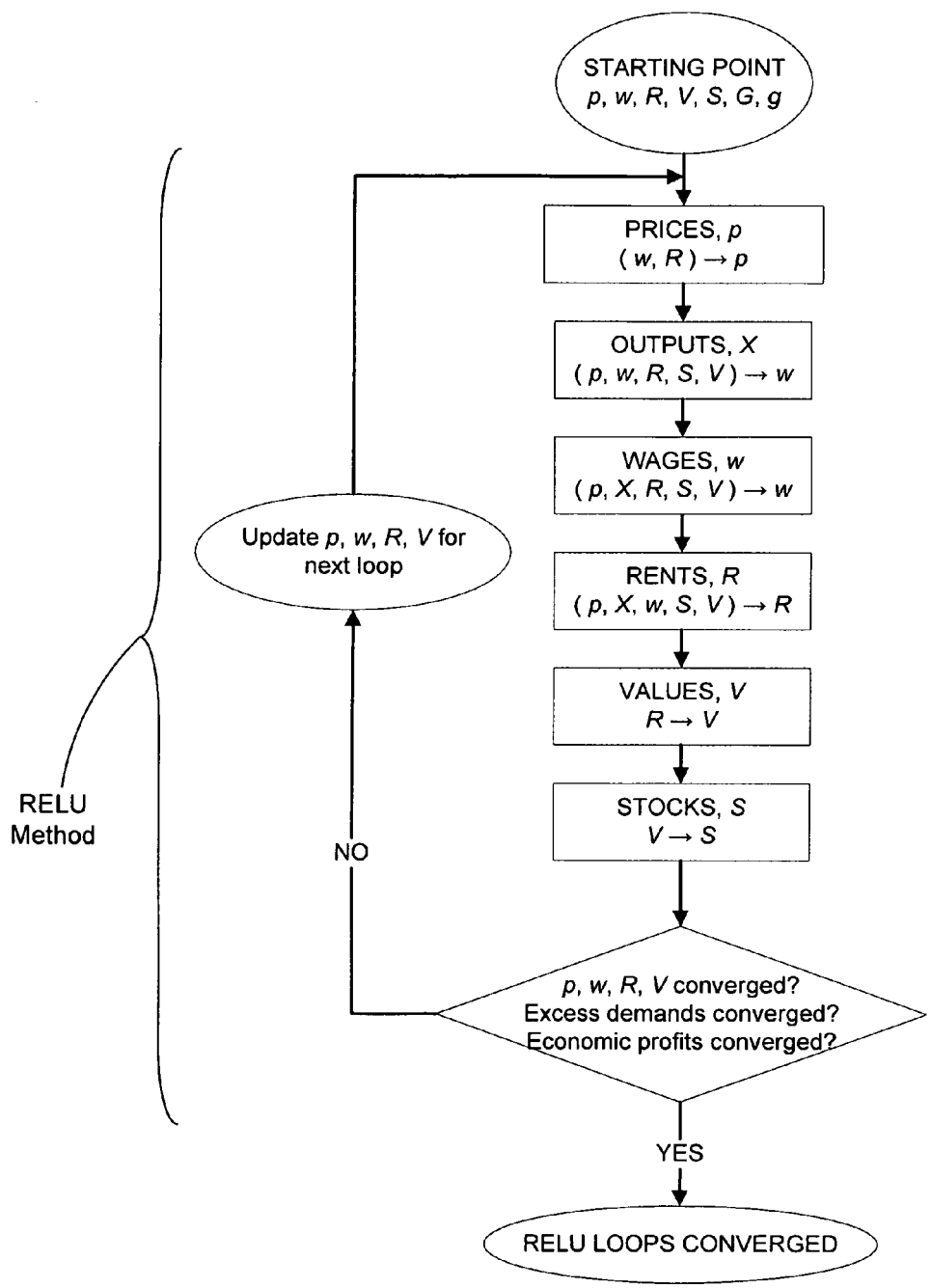
FIG. 3 is a flowchart depicting an embodiment of a present invention method of modeling regional economic and land use needs.

The unification of RELU and TRAN requires that the G and g derived by solving TRAN (See Section 4 above) are in fact those G and g that give rise to the RELUTRIPS matrix and all other quantities produced by solving RELU (See Section 3 above). Separate algorithms have been designed and coded to compute the RELU stationary general equilibrium and the TRAN stochastic user equilibrium to high degrees of numerical precision. The joint equilibration, i.e., unification, of RELU and TRAN is achieved by linking these two algorithms together so that the joint algorithm converges to a high degree of numerical precision. FIG. 2 shows a flowchart depicting an embodiment of a present invention method of modeling regional economic, land use and transportation, while FIG. 3 shows a flowchart depicting an embodiment of a present invention method of modeling regional economic and land use and FIG. 4 shows a flowchart depicting an embodiment of a present invention method of modeling transportation. The following discussion is best understood in view of FIGS. 1 through 4.

Results of testing the RELU-TRAN algorithm are reported for the 14 zone (plus one peripheral zone) delineation of the Chicago MSA according to FIG. 1. The road network shown in the figure is a somewhat crude aggregation of the underlying Chicago road network. Each aggregated road connecting a zone pair represents two links, one going in one direction and the other going in reverse. RELU-TRAN has been calibrated for the above 14+1 zone, 68-link setting using data circa 1990 according to the process described in Section 5 above. The four basic RELU industries, r=1, . . . , 4 are: 1) agriculture; 2) manufacturing; 3) business services; and, 4) retail. The four building types, k=1, . . . , 4 are: 1) single family residential; 2) multiple family housing; 3) industrial; and, 4) commercial. The populations in the four skill groups, f= 1, . . . , 4 correspond to the personal income quartiles in 1990. The calibrated model produces an equilibrium that simultaneously and exactly satisfies all of the equilibrium conditions of RELU-TRAN which we have described in Sections 2 through 4 above.

As shown in Table 1 below, this Chicago version of the RELU model consists of 588 equations linked to each other in a special block recursive manner, while TRAN consists of 68 equations. As shown in FIG. 3, the RELU algorithm is structured in a way that exploits the block-recursive nature of the equations. To solve the RELU model, the method begins with exogenously given expected travel time and monetary cost matrices G and g. In the RELU-TRAN unified equilibrium, the updated values of these variables become mutually consistent with those produced by TRAN. The RELU algorithm is as follows:

STEP 0 (Initialization). Arbitrary exogenous vectors of rents, R, wages, w, product-prices, p, real estate prices, V, and building stocks, S, serve as initial guesses. Given such guesses, as well as the given G and g and all exogenous variables and parameters, the following sequentially arranged steps complete a single loop of the RELU method as shown in FIG. 3.

STEP 1 (Product prices). The zero economic profit equations (18) are solved for the vector of equilibrium prices, p as a fixed point, given R, w and g.

STEP 2 (Industry outputs). Given the p from STEP 1, and the S, R, w and g, equations (28), (29) and (30) are solved in the manner of a conventional input-output model to determine industry outputs, X. More precisely, using g and p, the delivered price vectors are calculated first and then, $(\Re+2\aleph)\times(\Re+2\aleph)$ value-based input output coefficients, $a_{sn\to rj}$, for all industries in all zones, including any that are zeroes, are evaluated from equation (17). Equations (30) are then used to directly calculate the con-dem industry outputs, while the left sides of equations (29) are used to directly calculate the retail demands. Retail outputs by zone are then found from the left side of equation (29) by adding the exogenous exports to the retail demands. The value-based input-output coefficients of the non-retail $\mathfrak{R}-1$ basic industries are then arranged in a matrix $A=[a_{sn \to rj}]$. The classical input output solution is then $X=(1-A)^{-1} F$, where the right sides are the total final demands, F, comprised of exogenous exports plus demands from the con-dem and the retail industries:

$$\begin{bmatrix} X_{11} \\ \vdots \\ X_{R-1\mathcal{J}} \end{bmatrix} = \begin{bmatrix} 1 - a_{11 \to 11} & -a_{11 \to 12} & \cdots & -a_{11 \to R-1\mathcal{J}} \\ \vdots & \vdots & \vdots & \vdots \\ -a_{R-1\mathcal{J} \to 11} & -a_{R-1\mathcal{J} \to 12} & \cdots & 1 - a_{R-1\mathcal{J} \to 13} \end{bmatrix}^{-1}$$
$$\begin{bmatrix} \Xi_{11} + \left( \sum_{n=R+1}^{2N} \sum_{s=1}^{\mathcal{J}} a_{11 \to ns} X_{ns} \right) + \left( \sum_{s=1}^{\mathcal{J}} a_{11 \to Rs} X_{Rs} \right) \\ \vdots \\ \Xi_{R-1\mathcal{J}} + \left( \sum_{n=R+1}^{2N} \sum_{s=1}^{\mathcal{J}} a_{R-1\mathcal{J} \to ns} X_{ns} \right) + \left( \sum_{s=1}^{\mathcal{J}} a_{R-1\mathcal{J} \to Rs} X_{Rs} \right) \end{bmatrix}$$

STEP 3a (Commercial Rents). Given p from STEP 1 and X from STEP 2, and given S, the $\mathfrak{I}_{\aleph 2}$ commercial floor space excess demand equations (26) are solved simultaneously to determine an update of the commercial part of the rent vector, R.

STEP 3b (Residential Rents). Given S and V, the non-wage incomes, M, are calculated from equation (24) and given p from STEP 1, and also w, G and g, the residential floor space excess demand equations (25) are solved simultaneously to determine an updated residential rent vector, R.

STEP 4 (Wages). Given the rent vector, R, from STEP 3a and STEP 3b, the price vector, p, from STEP 1, the outputs X from STEP 2 and the non-wage incomes, M, calculated in STEP 3b, the labor market excess demand equations (27) are solved simultaneously to determine an updated wage vector, w.

STEP 5 (Real Estate Asset Prices). Given the rents, R, from STEP 3a and STEP 3b the asset bid-price zero-profit equations (23a) and (23c) are solved simultaneously to determine the stationary real estate price vector, V.

STEP 6 (Building stocks). Given the asset prices, V, equations (33a) and (33b) are solved simultaneously (separately for each model zone), to determine the stationary building stocks, S. This relies on knowing that once the real estate prices are found from STEP 5, the stationary construction-demolition probabilities $Q_{i0k}, Q_{ik0}$, $k=0, 1, \ldots, \aleph$ are explicitly calculated and the stocks can then be found from equations (33a) and (33b). To see this, note that the equations can be arranged in matrix form to directly solve for the vector of stationary building and land stocks in each zone i:

$$\begin{bmatrix} S_{i0} \\ S_{i1} \\ S_{i2} \\ \vdots \\ S_{i\aleph} \end{bmatrix} = \begin{bmatrix} m_1 Q_{i01} & -Q_{i10} & 0 & \cdots & 0 \\ m_2 Q_{i02} & 0 & -Q_{i20} & \cdots & 0 \\ \vdots & \vdots & \vdots & \vdots & \vdots \\ m_N Q_{i0\aleph} & 0 & 0 & \cdots & -Q_{i\aleph 0} \\ 1 & \frac{1}{m_1} & \frac{1}{m_2} & \cdots & \frac{1}{m_\aleph} \end{bmatrix} \begin{bmatrix} 0 \\ 0 \\ 0 \\ \vdots \\ J_i \end{bmatrix}$$

STEP 7 (Updating). Combining the results of STEP 1 through STEP 6, the algorithm has determined updated vectors p, X, R, w, V and S conditional on G and g and all exogenous variables and parameters. The present invention method then checks whether these updated vectors are converged and whether they simultaneously satisfy all of the equilibrium conditions of RELU to a desired level of accuracy in the manner discussed below. If not, then the next RELU loop is started by returning to STEP 1 with these updated vectors replacing the previous values of these vectors (See FIG. 3).

Iterations, Loops, Cycles. In each STEP 1, 3a, 3b, 4 and 5 and in TRAN a Newton-Raphson procedure iterates until some iteration t, when the elements of the super vector x=[p, w, R, V, FLOW] relevant to that STEP, satisfy the maximum relative error condition and the zero-profit or excess demands satisfy $$\max_{\forall i} \left( \left| \frac{x_{i,t} - x_{i,t-1}}{(1/2)(x_{i,t} + x_{i,t-1})} \right| \right) < ITERTOL \text{ and}$$

$$\max_{\forall i} \left( \left| \frac{LS_{i,t} - RS_{i,t-1}}{(1/2)(LS_{i,t} + RS_{i,t-1})} \right| \right) < ITEROL,$$

respectively. LS and RS left and right sides of the ith equation and ITERTOL is an arbitrarily small tolerance. With both sets of inequalities holding together, the step is considered converged. If a variable or function is still unconverged at any STEP after MAXIT, i.e., a maximum number of iterations, is reached at that step, then a new RELU loop begins as shown in FIG. 3.

RELU is considered converged in the $t^{th}$ loop when, for all of the RELU variables being calculated, $$\max_{\forall i} \left( \left| \frac{x_{i,t} - x_{i,t-1}}{(1/2)(x_{i,t} + x_{i,t-1})} \right| \right) < LOOPTOL,$$

where LOOPTOL is the RELU loop tolerance. As shown in FIG. 2, RELU loops are nested within RELU-TRAN cycles. In each new RELU-TRAN cycle, after the sequence of RELU loops converge, TRAN iteratively calculates a congested highway network equilibrium as a fixed point in link flows to a desired level of accuracy by satisfying the same iteration criterion as in the RELU iterations, and then TRAN finds the new FLOW and calculates the new G and g returning them to RELU (See FIG. 4). A new RELU-TRAN cycle then starts with these updated G and g as shown in FIG. 2. RELU-TRAN cycles are considered converged in some $t^{th}$ cycle, when the G and g satisfy $$\max_{\forall ij} \left( \left| \frac{G_{ij,t} - G_{ij,t-1}}{(1/2)(G_{ij,t} + G_{ij,t-1})} \right|, \left| \frac{g_{ij,t} - g_{ij,t-1}}{(1/2)(g_{ij,t} + g_{ij,t-1})} \right| \right) < CYCLETOL,$$

where CYCLETOL is the specified cycle tolerance. This procedure of Newton-Raphson iterations nested within RELU loops and RELU loops nested within RELU-TRAN cycles is continued until a convergent RELU-TRAN cycle is found and all variables, and at the end, also all excess demand and excess-profits satisfy the specified tolerances.

The CPU time within which convergence is achieved depends on how a sequence of iterations-loops-cycles is induced by the choice of the tolerances and on how small the tolerances are specified to be. In general, the algorithm can be operated in what we call the slow-cycle or the fast-cycle modes. Slow-cycle refers to the requirement that RELU loops are converged with a small LOOPTOL before the algorithm is allowed to go to TRAN, while a fast-cycle means that a larger LOOPTOL is chosen so that the algorithm passes from RELU to TRAN after fewer RELU loops. Similarly, RELU loops can be operated as slow, or fast, by setting ITERTOL so that each of the iterative steps in the RELU algorithm shown in FIG. 3, can be converged to a very high, or low, degree of accuracy before the next RELU loop begins.

Performance also depends on the manner in which updated variables are passed from one iteration to the next inside each STEP of the RELU algorithm. Note that each Newton-Raphson iteration begins with some Current($x_t$) which is the current value of variable x, adjusted in iteration t. After adjustment, the iteration finds a new candidate value for the variable which we will call New($x_t$). In the next iteration we set Current($x_{t+1}$)=$\overline{\omega}$(t)New($x_t$)+[1−$\overline{\omega}$(t)]Current($x_t$), where 0≦$\overline{\omega}$(t)<1. A sequence of weights $\overline{\omega}$(1),$\overline{\omega}$(2), ... $\overline{\omega}$(t), $\overline{\omega}$(t+1), ..., starting close to zero and moving to 1 incrementally, helps avoiding divergence. For example, in all the runs reported in Table 2 below, $\overline{\omega}$(t)=at and t≦MAXIT where MAXIT is the maximum number of iterations allowed, with MAXIT=3 and a=0.10. The present invention has also been tested with other methods for smoothing values of variables between iterations and with higher MAXIT values. The lower the MAXIT value, the faster each RELU loop, i.e., fast loop, completes, but more loops are required, i.e., slow cycle.

The method of testing the RELU-TRAN algorithm was as follows. The model was calibrated in such a way that a general equilibrium solution of RELU-TRAN was known exactly through the calibration. Given such a calibrated equilibrium point, the algorithm was systematically started from various large and small perturbations away from the calibrated equilibrium and observed two things:

1) Convergence: Whether the algorithm converged to an equilibrium point to a high degree of accuracy as specified by MAXIT, the three tolerances ITERTOL, LOOPTOL and CYCLETOL and the procedure of cycles, loops, iterations described above; and,
2) Uniqueness: Whether the equilibrium to which the algorithm converged was, to a very high degree of accuracy, the calibrated one or whether the algorithm converged to some other equilibrium.

Several smoothing and tolerance setting procedures were experimented with until the algorithm converged well in all the tests. The algorithm always converged to the calibrated equilibrium for all starting points so that all the relative errors comparing converged and calibrated values were within at least 0.0001 of their calibrated equilibrium values. This strongly suggests that the RELU-TRAN system of equations have a unique equilibrium solution at least within the large neighborhood of the calibrated equilibrium from which starting points were selected. The performance of a convergent algorithm was measured by several criteria. First, the CPU time required to achieve a convergent solution of the 656 equations on our machine was measured. A second criterion is the accuracy of the convergence as specified by the three tolerances. A third criterion is the monotonicity of the algorithm's convergence path, characterized by a non-increasing number of RELU loops within successive RELU-TRAN cycles. In all of the Table 2 runs presented below, ITERTOL=LOOPTOL=CYCLETOL, set at $1\times10^{-5}$, unless otherwise indicated, and a=0.10, while MAXIT=3 as noted earlier.

TABLE 2

Testing the convergence of the RELU-TRAN algorithm

| | Start point as percent deviation from equilibrium point | | | | Convergence to equilibrium (MAXIT = 3, a = 0.10) | | | |
|---|---|---|---|---|---|---|---|---|
| Var. | Wages w 56 (14 × 4) | Rents R 56 (14 × 4) | Time/Cost G, g 225 (15 × 15) | FLOW 68 | TOLERANCES (ITERTOL, LOOPTOL, CYCLETOL) | CPU Time (Min:Sec) | RELU-TRAN cycles | RELU loops by cycle |
| A | Uniform deviations | | | | | | | |
| 1 | 80 | 80 | 80 | 80 | $1 \times 10^{-5}$ | 3:53.7 | 8 | 69, 54, 40, 27, 12, 6, 1, 1 |
| 2 | 90 | 90 | 90 | 90 | $1 \times 10^{-5}$ | 3:36.0 | 8 | 65, 50, 36, 22, 9, 3, 1, 1 |
| 3 | 99 | 99 | 99 | 99 | $1 \times 10^{-5}$ | 2:32.0 | 7 | 51, 38, 18, 6, 2, 1, 1 |
| 4 | 101 | 101 | 101 | 101 | $1 \times 10^{-5}$ | 2:29.7 | 7 | 52, 35, 17, 6, 1, 1, 1 |
| 5 | 110 | 110 | 110 | 110 | $1 \times 10^{-5}$ | 3:37.0 | 8 | 67, 53, 36, 20, 8, 3, 1, 1 |
| 6a | 120 | 120 | 120 | 120 | $1 \times 10^{-3}$ | 1:46.8 | 5 | 42, 28, 7, 2, 1 |
| 6b | 120 | 120 | 120 | 120 | $1 \times 10^{-5}$ | 3:55.6 | 8 | 69, 56, 37, 29, 11, 8, 2, 1 |
| 6c | 120 | 120 | 120 | 120 | $1 \times 10^{-9}$ | 11:26.2 | 14 | 128, 113, 94, 84, 75, 65, 54, 44, 32, 19, 7, 3, 1, 1 |
| 6d | 130 | 130 | 130 | 130 | $1 \times 10^{-5}$ | 4:14.5 | 9 | 72, 56, 41, 30, 15, 7, 1, 1, 1 |
| 6e | 150 | 150 | 150 | 150 | $1 \times 10^{-5}$ | 4:37.1 | 9 | 82, 63, 45, 35, 22, 7, 3, 1, 1 |
| B | Non-uniform deviations | | | | | | | |
| 7 | 120 | 120 | 120 | 80 | $1 \times 10^{-5}$ | 3:56.0 | 8 | 69, 56, 37, 29, 11, 8, 2, 1 |
| 8 | 120 | 120 | 80 | 120 | $1 \times 10^{-5}$ | 3:54.3 | 8 | 70, 54, 40, 27, 12, 6, 1, 1 |
| 9 | 120 | 80 | 80 | 120 | $1 \times 10^{-5}$ | 3:47.4 | 8 | 61, 54, 40, 27, 12, 6, 1, 1 |
| 10 | 80 | 80 | 120 | 120 | $1 \times 10^{-5}$ | 3:55.9 | 8 | 71, 54, 37, 29, 8, 2, 1, 1 |
| 11 | 120 | 80 | 120 | 120 | $1 \times 10^{-5}$ | 3:50.5 | 8 | 59, 56, 37, 29, 8, 2, 1, 1 |
| 12a | 80 | 120 | 120 | 120 | $1 \times 10^{-3}$ | 1:42.7 | 5 | 39, 23, 7, 2, 1 |
| 12b | 80 | 120 | 120 | 120 | $1 \times 10^{-5}$ | 3:55.1 | 8 | 68, 54, 37, 29, 11, 8, 2, 1 |
| 12c | 80 | 120 | 120 | 120 | $1 \times 10^{-7}$ | 7:15.1 | 11 | 98, 85, 68, 58, 46, 38, 23, 9, 3, 2, 1 |
| 12d | 80 | 120 | 120 | 120 | $1 \times 10^{-9}$ | 11:22.7 | 14 | 125, 113, 94, 84, 73, 65, 54, 44, 32, 19, 7, 3, 1, 1 |
| C | Randomized deviations | | | | | | | |
| 13a | 80-120 | 80-120 | 80-120 | 80-120 | $1 \times 10^{-3}$ | 1:47.4 | 5 | 42, 27, 8, 2, 1 |
| 13b | 80-120 | 80-120 | 80-120 | 80-120 | $1 \times 10^{-5}$ | 2:49.7 | 7 | 40, 40, 36, 18, 5, 2, 1 |

TABLE 2-continued

Testing the convergence of the RELU-TRAN algorithm

| | Start point as percent deviation from equilibrium point | | | | Convergence to equilibrium (MAXIT = 3, a = 0.10) | | | |
|---|---|---|---|---|---|---|---|---|
| Var. | Wages w 56 (14 × 4) | Rents R 56 (14 × 4) | Time/Cost G, g 225 (15 × 15) | FLOW 68 | TOLERANCES (ITERTOL, LOOPTOL, CYCLETOL) | CPU Time (Min:Sec) | RELU-TRAN cycles | RELU loops by cycle |
| 13c | 80-120 | 80-120 | 80-120 | 80-120 | $1 \times 10^{-5}$ | 3:06.1 | 8 | 43, 46, 34, 18, 6, 2, 1, 1 |
| 13d | 80-120 | 80-120 | 80-120 | 80-120 | $1 \times 10^{-9}$ | 11:14.1 | 14 | 127, 110, 93, 85, 73, 63, 51, 42, 32, 17, 7, 2, 1, 1 |
| 14 | 70-130 | 70-130 | 70-130 | 70-130 | $1 \times 10^{-5}$ | 2:56.9 | 8 | 28, 37, 37, 23, 9, 3, 1, 1 |
| 15 | 60-140 | 60-140 | 60-140 | 60-140 | $1 \times 10^{-5}$ | 3:00.8 | 8 | 30, 34, 37, 26, 12, 4, 1, 1 |
| 16 | 50-150 | 50-150 | 50-150 | 50-150 | $1 \times 10^{-5}$ | 3:11.7 | 8 | 52, 50, 30, 16, 8, 2, 1, 1 |

There are runs, A, B and C in Table 2, grouped according to how the calibrated equilibrium was perturbed to obtain a starting point for the first RELU-TRAN cycle. In the A group, all elements of the starting vectors w, R, G, g and FLOW are perturbed by the same percentage relative to the calibrated equilibrium. For example, 120 means that all of these vectors are uniformly set at exactly 120% of their calibrated equilibrium values. In the B group runs, different vectors are perturbed by different percentages, while in the C group runs a random number generator is used to sample the value of each element of each vector within an indicated percentage range around the calibrated equilibrium. For example, in run 16 a range of 50-150 means that the starting point of each element of each vector is sampled from within 50% to 150% of the calibrated equilibrium according to the uniform distribution of percentages in that range.

In Table 2, virtually all runs exhibit essentially monotonic convergence. A slightly non-monotonic path is encountered only in runs 13c, 14 and 15. The behavior of the algorithm exhibits the regularities that one would intuitively expect from the way the starting points and the tolerances are set. Through the above described testing, three (3) regularities were observed:

Regularity 1 (Starting point's "distance" from equilibrium): In the A group runs, increasing the deviations from equilibrium from ±1% to ±20%, while keeping the tolerances and the smoothing procedure constant, increases the number of RELU-TRAN cycles from 7 to only 8, but considerably increases the number of RELU loops within the corresponding cycles of the different runs;

Regularity 2 (Random sampling of starting point): In the C group runs, keeping tolerances and deviations from the calibrated equilibrium constant, the different outcomes of random sampling within the same range does not materially affect the time to convergence as seen from runs 13b and 13c, for example; and, Regularity 3 (Accuracy requirement): Comparing runs 6a-6c from A group runs, or 12a-12d from B group runs, or 13a-13d from C group runs shows that when the deviation from the calibrated equilibrium is kept the same but the accuracy requirement is increased by decreasing the tolerance from $1 \times 10^{-3}$ to $1 \times 10^{-5}$ to $1 \times 10^{-7}$ and even down to $1 \times 10^{-9}$, then the cycles required to converge, increase from 5 to 8 to 14. The loops within the corresponding cycles of the different runs also increase significantly.

It should be noted that the algorithm is coded in Fortran and all of the above described tests of the algorithm were performed on a UNIX-based Sun Microsystems Ultra Sparc server running Solaris 2.8, with CPU speed of 360 MHz and 1 gigabyte RAM. As one of ordinary skill in the art recognizes, the integrity of the source code is independent of the machine environment.

Section 7. Utility of the Unified RELU-TRAN Model—Policy Analysis and Ongoing Uses The microeconomic structure of the RELU-TRAN model, the design of an algorithm for solving the model's stationary general equilibrium and the numerical testing of the algorithm for a 656-equation version of the model has been described above. As explained supra, the model is a synthesis of previous less general models, all of which are based on discrete choice theoretic treatments of the underlying microeconomic theory. This approach to modeling metropolitan areas is realistic, useful and flexible and avoids some of the theoretical, empirical and computational limitations of other approaches.

One of ordinary skill in the art will appreciate that there are also applications of the model for evaluation of the social costs and benefits of a variety of urban policies. Because of the general equilibrium nature of the current RELU-TRAN model, a much broader menu of policies can be evaluated than has been possible in the past. The effects of metropolitan policies spanning transportation, land use, real estate development and industrial location and production can be evaluated simultaneously. One area of such policies concerns the impact of highway capacity expansion or new highways on economic productivity and on urban sprawl in metropolitan areas. Additionally, the instant invention can be used to evaluate: what types of transportation investments increase aggregate metropolitan products by industry; and, is a higher level of production associated with a higher degree of urban sprawl and if so, are there land use restrictions, i.e., "smart growth", that limit sprawl while enhancing or not excessively reducing urban production. It is also within the spirit and scope of the claimed invention to expand the model to incorporate energy consumption by residential and industrial activity and by automobiles, and to calculate emissions from stationary and mobile sources.

As discussed above, the RELU and RELU-TRAN algorithms include unique sub-algorithms for calibrating as well as for solving the equations of RELU and RELU-TRAN by treating the interrelations among the urban/metropolitan sectors fully. More precisely, the methods treat the following sectors: (a) land use; (b) real estate market including residential and non-residential buildings including both the markets for floor space by residential and non-residential users and also the construction and demolition of residential and commercial buildings; (c) labor market; (d) production and product exchanges among a number of industries such as agriculture, manufacturing, business services and retail; (e) personal travel inclusive of commuting and discretionary trip making; (f) imports and exports; and, (g) earned and unearned income.

The key innovation in the RELU algorithm is the manner in which the interrelations of the above sectors are solved simultaneously so as to correctly calculate an equilibrium that is consistent with economic theory and economic principles.

The RELU and RELU-TRAN algorithms can be used as a unique tool by a variety of practitioners who are required or are interested in examining aspects of urban planning, urban development questions or problems. The relevant practitioners are urban planners, transportation planners, developers, practitioners such as consultants engaged on urban and transportation issues, academic experts engaged on urban and transportation problems, government officials and experts studying urban and transportation problems.

Among such problems or questions that can be examined using RELU and RELU-TRAN include, but are not limited to, the following: 1) Highway capacity expansions or reductions—the addition or removal of new roads or the taking of actions to expand the capacity of existing roads on an urban/metropolitan highway network; 2) Transit system expansions or reductions—the addition or removal of new transit lines or systems or the taking of actions to expand the capacity of existing urban/metropolitan transit systems; 3) Changes in the pricing of urban transportation—pricing actions such as tolls, fare changes, cordon tolls, congestion tolls, parking taxes imposed on various routes or highway links of the road or transit networks or various parts of the metropolitan area; 4) Land use restrictions—restricting land use in various zones of the metropolitan area by disallowing construction on some land or disallowing the construction or demolition of certain types of buildings while allowing others, restricting the total amount of land allowed for construction or demolition, restricting the total amount of land that can be developed in certain areas without disallowing particular types of buildings, zoning changes in particular areas from residential to commercial or vice versa or zoning changes in favor of particular residential/commercial buildings, restrictions of the total amount of land that can be placed in a particular type of land use such as residential, commercial or a particular type of residential or commercial, imposition of cordon lines or boundaries beyond which development in the urban use is not allowed, i.e., urban growth boundaries, restrictions of building development according to building densities; 5) Changes in tax rates—changes in income and/or property taxes affecting an urban/metropolitan area, a particular group of people within the urban/metropolitan area or a particular building type within the metropolitan area; 6) Changes in population—changes in the total population of an urban area including increases or decreases in the population; 7) Changes in production technology—changes that affect the general productivity of certain industries in a metropolitan area or in how these industries interact with other industries, how these industries use labor of various skill levels or utilize different types of buildings or utilize inputs from other industries; 8) Changes in building technology—the introduction of new building types, either residential or commercial, described by their ratios of floor space to land acreage, i.e., development density; 9) Regional growth driven by exports—changes in the growth or shrinkage of exports/imports from specific industries in an urban/metropolitan economy; and, 10) Changes in relative and absolute income levels—changes in the absolute or relative income levels of various groups in the population, e.g., income quartiles, driven by broad changes in the economy, taking into account both wage and non-wage incomes.

For each of the above described problems and questions, RELU and RELU-TRAN produce a detailed list of information items that can be used by the user of RELU and RELU-TRAN to study the problem and/or question and to form judgments as to its effects. This list of information items contains the following for each zone or pair of zones of the metropolitan or urban area, but also for the aggregate area, the methods provide the following information: 1) Employment/unemployment by income levels; 2) Number of employed an unemployed by income level; 3) Average and total income levels and composition by wage and non-wage income; 4) Income levels of workers by industry in which they are employed; 5) Wages of workers by industry; 6) Rents and real estate prices for vacant land and for each type of residential and commercial building; 7) Floor space in each type of residential or commercial building in existing as well as newly constructed buildings; 8) Vacant land acreage and vacant land created by demolition of buildings of each type; 9) Vacant floor space by type of building; 10) Value of output created by each industry, e.g., agriculture, manufacturing, business services and retail, in the urban/metropolitan area; 11) Value of trade among industries in the urban/metropolitan area; 12) Daily trips among the zones of the metropolitan area by autos, public transit and all other means aggregated together; 13) Whether such trips are commutes, i.e., trips to work, or whether they are discretionary; 14) Average travel time and monetary travel cost between all pairs of zones in an urban/metropolitan area by mode of travel such as auto, transit, other and by purpose of travel such as commuting or discretionary; 15) The level of traffic congestion and travel time on each highway link; 16) Time allocated to work or to travel by various income groups; and, 17) Trade flows, i.e., volume of goods, among different industries located in different zones of the urban/metropolitan area, as well as goods purchased from the retail industry in each zone by the consumers.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A method for forecasting future economic conditions, land utilization and transportation network utilization and performance of a metropolitan area having a plurality of economic zones, said method comprising the steps of:
   a) receiving a set of calibration values from a first input device;
   b) calculating a set of calibration constants with a first arithmetic logic unit, based on the set of calibration values;
   c) receiving a set of initial values for a set of desired outputs from a second input device, wherein said set of desired outputs comprises regional economic, land use and transportation outputs;
   d) calculating said regional economic and land use outputs with a second arithmetic logic unit, wherein an initial calculation of said regional economic and land use outputs is based on a portion of the set of initial values and said regional economic and land use outputs comprise a first group of variable travel demands;

e) calculating an origin to destination matrix with a third arithmetic logic unit, wherein an initial calculation of said origin to destination matrix is based on a portion of the set of initial values and said origin to destination matrix comprises two-way daily person trips between an origin economic zone and a destination economic zone according to the equation $$RELUTRIPS_{ij} = \left(\sum_{\forall f} N_f \sum_{k=1}^{\aleph_1} P_{ijk|f}\right) + \left(\frac{1}{d}\right)\left(\sum_{\forall f} N_f \sum_{s=0}^{\vartheta'} \sum_{k=1}^{\aleph_1} P_{isk|f} c_{isf} Z_{j|isf}\right);$$

$$j > 0, i = 1 \ldots \vartheta',$$

where $P_{ijk|f} = P_{ijk|f}(p_R, R, w, M_f, G, g)$ and $Z_{j|isf} = Z_{j|isf}(p^R, w_{sf}, M_f, G_{is}, g_{is}, G_j, g_j)$;

f) calculating said transportation outputs with a fourth arithmetic logic unit, wherein an initial calculation of said transportation outputs is based on a portion of the set of initial values and said transportation outputs comprise a second group of variable travel demands;

h) repeating steps d) through f) until said first group of variable travel demands is substantially the same as said second group of variable travel demands; and, g) providing said set of desired outputs to an output device.

2. The method for forecasting future economic conditions, land utilization and transportation network utilization and performance of a metropolitan area of claim 1 wherein said method is arranged to respond to said first and second group of travel demands.

3. The method for forecasting future economic conditions, land utilization and transportation network utilization and performance of a metropolitan area of claim 1 wherein interrelations of said regional economic, land use and transportation outputs are solved simultaneously to calculate an equilibrium between said regional economic, land use and transportation outputs.

4. The method for forecasting future economic conditions, land utilization and transportation network utilization and performance of a metropolitan area of claim 1 wherein said set of calibration constants is calculated based on the set of calibration values by a method comprising the steps of:

a) calculating after tax wages with said first arithmetic logic unit;

b) calculating non-wage incomes with said first arithmetic logic unit;

c) calculating labor supplies and places of employment by skill levels with said first arithmetic logic unit;

d) calculating full incomes, residential floor space demands and full choice probabilities for workers with said first arithmetic logic unit;

e) calculating residential floor space demands and full choice probabilities for non-workers with said first arithmetic logic unit;

f) calculating aggregate residential floor space demands and structural densities with said first arithmetic logic unit;

g) calculating aggregate labor demands by distributing labor supplies by skill levels among industries in each economic zone and initialization of aggregate building demands with said first arithmetic logic unit;

h) calculating initial floor space stocks and structural densities with said first arithmetic logic unit;

i) calculating construction and demolition probabilities with said first arithmetic logic unit;

j) calculating unit prices and real and nominal outputs for construction and demolition with said first arithmetic logic unit;

k) calculating labor demands of construction and demolition industries and adjusted labor demands of other industries with said first arithmetic logic unit;

m) calculating nominal outputs of primary industries and updated structural densities with said first arithmetic logic unit;

n) repeating steps i) through m) until said structural densities converge;

o) calculating leading terms of price equations with said first arithmetic logic unit;

p) calculating labor demand constants with said first arithmetic logic unit;

q) calculating building demand constants with said first arithmetic logic unit;

r) calculating retail demands with said first arithmetic logic unit, wherein said retail demands comprise trip quantities and demanded retail goods;

s) repeating steps a) through r) until non-negative retail exports converge;

t) calculating delivered prices of intermediate inputs and initial input demand constants with said first arithmetic logic unit;

u) calculating intermediate goods demands and net exports of non-retail industries with said first arithmetic logic unit;

v) repeating step u) until said calculated intermediate goods demands and net exports of non-retail industries converge;

w) calculating scale factors for industries with said first arithmetic logic unit;

x) calculating a total asset income, outside incomes and earned income shares with said first arithmetic logic unit;

y) calculating occupancy dispersion parameters and constants with said first arithmetic logic unit;

z) calculating dispersion parameters of construction and demolition with said first arithmetic logic unit;

aa) calculating constants of construction and demolition with said first arithmetic logic unit;

ab) calculating constants of retail demand functions with said first arithmetic logic unit;

ac) calculating constant effects and dispersion of worker and non-worker choice probabilities with said first arithmetic logic unit; and, ad) calculating constant effects and dispersions in mode choice with said first arithmetic logic unit.

5. The method for forecasting future economic conditions, land utilization and transportation network utilization and performance of a metropolitan area of claim 1 wherein said set of initial values comprises product prices, industry outputs, wages, rents, real estate asset values and stationary real estate stocks.

6. The method for forecasting future economic conditions, land utilization and transportation network utilization and performance of a metropolitan area of claim 1 wherein the initial calculation of said regional economic and land use outputs is based on a portion of the set of initial values and said regional economic and land use outputs are calculated by a method comprising the steps of:

a) calculating product prices with said second arithmetic logic unit;

b) calculating industry outputs with said second arithmetic logic unit;
c) calculating wages with said second arithmetic logic unit;
d) calculating rents with said second arithmetic logic unit;
e) calculating real estate asset values with said second arithmetic logic unit;
f) calculating stationary real estate stocks with said second arithmetic logic unit; and,
g) repeating steps a) through f) until said prices, outputs, wages, rents, values and stocks converge, and until excess demands and economic profits converge.

7. The method for forecasting future economic conditions, land utilization and transportation network utilization and performance of a metropolitan area of claim 1 wherein said regional economic and land use outputs comprise product prices, industry outputs, wages, rents, real estate asset values and stationary real estate stocks.

8. The method for forecasting future economic conditions, land utilization and transportation network utilization and performance of a metropolitan area of claim 7 wherein said regional economic and land use outputs further comprise excess demands and economic profits.

9. The method for forecasting future economic conditions, land utilization and transportation network utilization and performance of a metropolitan area of claim 7 wherein said regional economic and land use outputs further comprise expected travel times and expected travel monetary costs.

10. The method for forecasting future economic conditions, land utilization and transportation network utilization and performance of a metropolitan area of claim 1 wherein the initial calculation of said transportation outputs is based on a portion of the set of initial values and said transportation outputs are calculated by a method comprising the steps of:
a) calculating auto mode probabilities with said third arithmetic logic unit;
b) calculating route choices and network equilibrium flows with said third arithmetic logic unit;
c) repeating step b) until said route choices and network equilibrium flows converge;
d) calculating congested highway link travel times with said third arithmetic logic unit; and,
e) calculating zone to zone expected travel times and costs with said third arithmetic logic unit.

11. The method for forecasting future economic conditions, land utilization and transportation network utilization and performance of a metropolitan area of claim 1 wherein said transportation outputs comprise zone to zone expected travel times and costs.

12. The method for forecasting future economic conditions, land utilization and transportation network utilization and performance of a metropolitan area of claim 11 wherein said transportation outputs further comprise auto mode probabilities, route choices, network equilibrium flows and congested highway link travel times.

13. The method for forecasting future economic conditions, land utilization and transportation network utilization and performance of a metropolitan area of claim 1 wherein at least two of said first, second, third and fourth arithmetic logic units are the same.

14. The method for forecasting future economic conditions, land utilization and transportation network utilization and performance of a metropolitan area of claim 1 wherein said first and second input devices are the same.

15. The method for forecasting future economic conditions, land utilization and transportation network utilization and performance of a metropolitan area of claim 1 wherein at least one of said first and second input devices is a keyboard, a memory storage device or an optical device.

16. The method for forecasting future economic conditions, land utilization and transportation network utilization and performance of a metropolitan area of claim 1 wherein said output device is a computer monitor, a computer printout or a memory storage device.

* * * * *